United States Patent [19]
Cannon

[11] Patent Number: 5,983,239
[45] Date of Patent: Nov. 9, 1999

[54] STORAGE MANAGEMENT SYSTEM WITH FILE AGGREGATION SUPPORTING MULTIPLE AGGREGATED FILE COUNTERPARTS

[75] Inventor: David Maxwell Cannon, Tucson, Ariz.

[73] Assignee: International Business Machines Corporation, Armonk, N.Y.

[21] Appl. No.: 08/960,627

[22] Filed: Oct. 29, 1997

[51] Int. Cl.⁶ .................................................. G06F 17/30
[52] U.S. Cl. .......................... 707/200; 707/203; 707/205
[58] Field of Search .................................... 707/200, 203, 707/205

[56] References Cited

U.S. PATENT DOCUMENTS

| | | | |
|---|---|---|---|
| 4,027,288 | 5/1977 | Barton et al. | 340/172.5 |
| 4,310,883 | 1/1982 | Clifton et al. | 364/200 |
| 4,499,539 | 2/1985 | Vosacek | 364/200 |
| 4,849,878 | 7/1989 | Roy | 707/200 |
| 5,175,848 | 12/1992 | Dysart et al. | 707/203 |
| 5,218,696 | 6/1993 | Baird et al. | 395/600 |
| 5,241,672 | 8/1993 | Slomcenski et al. | 707/205 |
| 5,423,034 | 6/1995 | Cohen-Levy et al. | 395/600 |
| 5,435,004 | 7/1995 | Cox et al. | 707/205 |
| 5,513,351 | 4/1996 | Grantz | 395/600 |
| 5,535,390 | 7/1996 | Hildebrandt | 395/700 |
| 5,537,636 | 7/1996 | Uchida et al. | 707/200 |
| 5,561,793 | 10/1996 | Bennett et al. | 395/600 |
| 5,579,507 | 11/1996 | Hosouchi et al. | 395/497.02 |

(List continued on next page.)

FOREIGN PATENT DOCUMENTS

WO 97/08623  3/1997  WIPO ............................. G06F 13/00

OTHER PUBLICATIONS

Abstract No. 89–144137 for JP 01–144137, T. Nishimura, "File Managing System"., Jun. 6, 1989.

"DASD Fast Write from Multiple Sources Using Journals", *IBM Technical Disclosure Bulletin*, vol. 38, No. 6, Jun. 1995, pp. 425–431.

"Packing Variable–Sized Segments in the Swap File of a Paging–Based Virtual Memory System", *IBM Technical Disclosure Bulletin*, vol. 39, No. 3, Mar. 1996, pp. 301–302.

"Optical Library Cache Reclaim Strategies", *IBM Technical Disclosure Bulletin*, vol. 37, No. 6B, Jun. 1994, pp. 469–471.

*Primary Examiner*—Thomas G. Black
*Assistant Examiner*—Frantz Coby
*Attorney, Agent, or Firm*—Gray Cary Ware Freidenrich

[57] ABSTRACT

A data storage subsystem employs managed files comprising one or a contiguous aggregation of multiple constituent user files. A mapping table cross-references each managed file with the names and locations of its constituent user files. A storage table cross-references each managed file with its address. Eventually, "deleted-file space" arises as individual user files are deleted from managed files. "Reconstruction" consolidates managed files to regain this wasted space. Reconstruction preferably permits multiple embodiments of a managed file called "siblings". Reconstruction identifies contiguous regions of user files within a managed file, and copies these regions to adjacent locations in a target area. Before entering the reconstructed file in any tables, the mapping table is searched for a "paradigm" managed file containing the same user files as the reconstructed file. Finding a paradigm file, the storage table is modified by deleting reference to the pre-reconstruction filename, and adding an entry cross-referencing the paradigm file with the reconstructed file's storage address. Not finding the paradigm file, a new sibling filename is designated for the reconstructed file, an entry is added to the mapping table, cross-referencing the sibling with its constituent user files and their locations within the reconstructed file, reference to the pre-reconstruction file is deleted from the storage table, and an entry is added to the storage table, cross-referencing the sibling with its address. Finally, if the storage table has no other instances of the pre-reconstruction file, reference to the pre-reconstruction file is purged from the mapping table.

42 Claims, 12 Drawing Sheets

U.S. PATENT DOCUMENTS

| | | | |
|---|---|---|---|
| 5,592,669 | 1/1997 | Robinson et al. | 395/622 |
| 5,619,690 | 4/1997 | Matsumani et al. | 707/200 |
| 5,619,699 | 4/1997 | Golshani et al. | 395/705 |
| 5,623,667 | 4/1997 | Golshani et al. | 395/705 |
| 5,627,967 | 5/1997 | Dauerer et al. | 395/188.01 |
| 5,627,985 | 5/1997 | Fetterman et al. | 395/393 |
| 5,634,050 | 5/1997 | Krueger et al. | 395/616 |
| 5,644,766 | 7/1997 | Coy et al. | 395/620 |
| 5,649,200 | 7/1997 | Leblang et al. | 395/703 |
| 5,666,553 | 9/1997 | Crozier | 395/803 |
| 5,794,042 | 8/1998 | Terada et al. | 395/701 |

STORAGE MANAGEMENT SYSTEM WITH FILE AGGREGATION SUPPORTING MULTIPLE AGGREGATED FILE COUNTERPARTS

BACKGROUND OF THE INVENTION

1. Field of the Invention

The present invention relates to the storage of digital data signals. More particularly, the invention concerns the storage and use of "managed" files, each comprising one or an aggregation of multiple constituent "user" files, in order to reduce file management overhead costs. Even more particularly, the invention involves the reclamation of wasted space that occurs within managed files due to deletion of some but not all constituent user files, which is facilitated by the use of multiple counterpart managed files called "siblings".

2. Description of the Related Art

The electronic management of data is central in this information era. Scientists and engineers have provided the necessary infrastructure for widespread public availability of an incredible volume of information. The internet is one chief example. In addition, the high-technology industry is continually achieving faster and more diverse methods for transmitting and receiving data. Some examples include satellite communications and the ever-increasing baud rates of commercially available computer modems.

With this information explosion, it is increasingly important for users to have some means for storing and conveniently managing their data. In this respect, the development of electronic data storage systems is more important than ever. And, engineers have squarely met the persistent challenge of customer demand by providing speedier and more reliable storage systems.

As an example, engineers at INTERNATIONAL BUSINESS MACHINES® (IBM®) have developed various flexible systems called "storage management servers", designed to store and manage data for remotely located clients. One particular system is called the ADSTAR™ Distributed Storage Manager (ADSM™) product. With the ADSM product, a central server is coupled to multiple client platforms and one or more administrators. The server provides storage, backup, retrieval, and other management functions for the server's clients.

Although the ADSM product includes some significant advances and also enjoys significant commercial success today, IBM has continually sought to improve the performance and efficiency of this and other data storage systems. One area of particular focus is the time associated with storing a customer's file in a storage facility. Obviously, this time includes the actions of physically storing the data, known as input/output or "I/O" time. Additionally, file storage requires the expenditure of various "overhead" time, including (1) preparing the media to store the data ("media preparation overhead"), and (2) updating pointers, databases, tables, directories, catalogs, and other information maintained about the stored data ("bookkeeping overhead"). In the case of tape media, preparing the media for storage involves positioning the tape and advancing the tape to a desired speed. With disk media, preparation of the media requires time to spin-up the media, and also "seek time" to find a desired sector and track to begin writing.

The storage of each file requires both media preparation overhead and bookkeeping overhead, delaying completion of the entire storage process. The overhead for storage of a file is independent of that file's size. Thus, the overhead for a large file is overshadowed by its more substantial I/O time. The opposite is true with small files, where the necessary overhead dominates the file storage process compared to the file's relatively short I/O time. Consequently, I/O time is the chief obstacle in speedier storage of large files, whereas overhead prevents small files from being stored faster. Although some useful solutions have been proposed for these problems, IBM is nevertheless seeking better ways of addressing these problems to further improve the performance and the efficiency of its products to benefit its customers.

SUMMARY OF THE INVENTION

Broadly, the present invention concerns the storage and use of managed files, each comprising one or an aggregation of multiple constituent user files, in order to reduce file management overhead costs. Managed files containing multiple user files in aggregation are referred to as "aggregate" files. File management is conducted in a storage management system including a data storage subsystem coupled to one or more client stations. The subsystem receives multiple user files from a client station. In response, the subsystem creates a contiguous managed file by aggregating selected received user files in accordance with certain predetermined criteria. Creation and use of the managed file is transparent to the client stations. To aid in managing the aggregate files, the subsystem provides a mapping table. The mapping table includes a first table that lists, for each user file contained in a managed file, a corresponding location of that user file within that managed file.

With this hardware and table structure, the system is able to conduct file management with reduced overhead by grouping smaller user files into larger aggregate files. For example, internal data management operations are performed, including at least a copy operation. Copying involves copying a managed file as a contiguous unit from a first location in the data storage subsystem to a second location in the data storage subsystem.

In addition to internal data management operations, the subsystem satisfies client output requests, including at least a retrieve operation. A retrieve operation starts when the subsystem receives a retrieval request, identifying a user file, from a client station. In response, the subsystem employs the mapping table to determine the identified user file's location in a managed file. Referencing the identified user file's location in its managed file enables the subsystem to obtain a copy of the identified user file. Finally, the subsystem provides the file copy to the requesting client station.

One especially beneficial aspect of the invention focuses upon the reclamation of wasted space between managed files, and also space that occurs within aggregate files due to deletion of some but not all constituent user files. In particular, each aggregate file is originally created with a contiguous aggregation of user files. Subsequently, unused space arises as individual user files are deleted from their respective aggregate files. This space is called "unused" or "deleted-file space". Also, "inter-file" space may arise, for example, when entire managed files are deleted. Reclamation is triggered when the amount of deleted-file and inter-file space in a prescribed storage area satisfies certain criteria. The criteria may be satisfied, for example, when the data storage "efficiency" in the prescribed storage area drops below a predetermined threshold. The prescribed storage area may be one or more managed files, a volume of data, an entire storage device, a storage pool, or another convenient unit of storage space.

Reclamation is applied to the prescribed storage area one managed file at a time. Each managed file is reviewed to determine whether it contains any deleted-file space. This review may involve reading a continuously maintained table listing each managed file's original size and current, "active" size. Managed files without any deleted-file space are simply copied intact to the target storage region. If the current managed file contains deleted-file space, however, a "reconstruction" process is performed for that file. Reconstruction identifies contiguous regions of user files within the managed file, then copies all identified contiguous regions to adjacent locations in a target storage region. Preferably, reconstructed managed files are placed adjacent to each other in the target region to eliminate inter-file wasted space. After all managed files in the prescribed storage area are copied or reconstructed, reclamation of the prescribed storage area is complete.

Another especially beneficial aspect of the invention involves an implementation of reconstruction to allow multiple embodiments of a managed file called "siblings". The managed files, including siblings, are represented in the mapping table, which cross-references each managed file with its constituent user files and a corresponding location of that user file within the managed file. A storage table is also provided, cross-referencing each managed file with an address in the subsystem containing that managed file.

Sibling-compatible reconstruction starts when a request is received to reconstruct a first managed file having an original filename. This request is preferably generated internally by the data storage subsystem, in response to various events such as application of reconstruction criteria. In response to the request, the first managed file is reconstructed by identifying contiguous regions of user files within the managed file, and copying the identified contiguous regions to adjacent locations in a target storage area. The target storage area may be the same or different than a storage area where the managed file originally resides.

Next, the subsystem searches the mapping table for a "paradigm" managed file. The paradigm managed file has contents identical to the reconstructed first managed file, without any interstitial vacancies due to deleted-file space. The paradigm managed file is said to have a paradigm filename. If a paradigm managed file is found, the subsystem deletes the storage table reference to the reconstructed first managed file; also in the storage table, a new entry is added cross-referencing the paradigm filename with an address in the subsystem containing the reconstructed managed file. Thus, the reconstructed first managed file is now considered to be another instance of the paradigm file.

If, however, no paradigm managed file is found, a sibling filename is designated for the reconstructed first managed file. In this case, a new entry is made to the mapping table, cross-referencing the sibling filename with each constituent user file and a corresponding location of each user file within the reconstructed first managed file. Also, the subsystem deletes reference in the storage table to the reconstructed first managed file. Moreover, in the storage table, a new entry is added cross-referencing the sibling filename with an address in the subsystem containing the reconstructed managed file.

Finally, regardless of whether a paradigm managed file was located, the subsystem searches the storage table for the original filename, and if not found, updates the mapping table by deleting reference to the original filename.

Accordingly, in one embodiment, the invention may be implemented to provide a method of file management using aggregated user files supporting multiple managed file counterparts called "siblings". In another embodiment, the invention may be implemented to provide an apparatus, such as a data storage subsystem, configured to manage files including aggregated user files, supporting multiple siblings. In still another embodiment, the invention may be implemented to provide a signal-bearing medium tangibly embodying a program of machine-readable instructions executable by a digital data processing apparatus to perform method steps for file management using aggregated user files while supporting multiple siblings.

The invention affords its users with a number of distinct advantages. Chiefly, the invention provides aggregation of user files for improved performance, along with reclamation of unused space from aggregated files, while still providing duplication of storage data for availability and recoverability. As a more particular example, the invention facilitates restoring a failed reconstructed managed file from a pre-reconstruction backup copy. Similarly, the invention facilitates retrieval of a desired user file from a backup copy of a primary managed file, even when the primary managed file has been reconstructed. Additionally, the use of siblings avoids the need to perform an updated backup operation whenever a primary managed file is reconstructed. Instead, a previously existing, un-reconstructed backup copy continues to exist, fully indexed in all storage, mapping, and managed file attribute tables. The invention also provides a number of other advantages and benefits, which should be apparent from the following description of the invention.

DETAILED DESCRIPTION OF THE PREFERRED EMBODIMENTS

Figure 1:
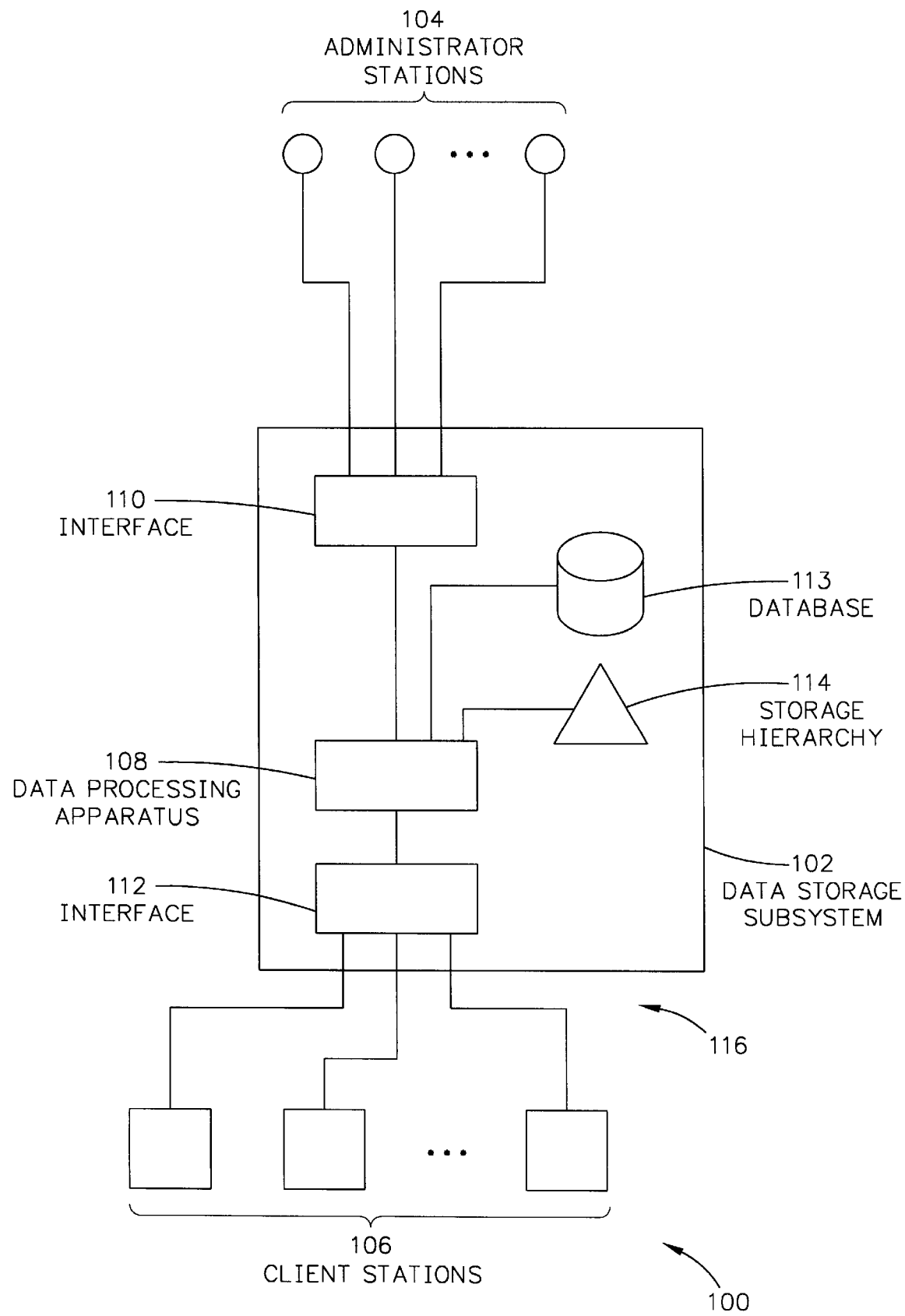
FIG. 1 is a block diagram of the hardware components and interconnections of a storage management system in accordance with the invention.

The nature, objects, and advantages of the invention will become more apparent to those skilled in the art after considering the following detailed description in connection with the accompanying drawings. As mentioned above, the invention concerns the storage and use of "managed" files, each comprising an aggregation of one or multiple individual "user" files, in order to reduce file management overhead costs. This overhead reduction is especially significant with small user files.

HARDWARE COMPONENTS & INTERCONNECTIONS

General Description of Data Storage System

Introduction

One aspect of the invention concerns a storage management system, which may be embodied by various hardware components and interconnections. One example is shown by the storage management system 100 of FIG. 1. Broadly, the system 100 includes a data storage subsystem 102, one or more administrator stations 104, and one or more client stations 106. The subsystem 102 operates in response to directions of the client stations 106, as well as the administrator stations 104.

The administrator stations 104 are used by system administrators to configure, monitor, and repair the subsystem 102. Under direction of an end user, the client stations 106 use the subsystem 102 to store and manage data on their behalf. More particularly, each client station 106 creates and regards data in the form of "user files". In this regard, each client station 106 separately employs the subsystem 102 to archive, backup, retrieve, and restore its user files. Accordingly, each user file is associated with a single client station 106, which is the source of that user file.

Client Stations

Each client station 106 may comprise any general purpose computer, such as an RS-6000 based workstation, PENTIUM processor based personal computer, mainframe computer, etc. The client stations 106 may comprise similar or different machines, running the similar or different operating systems. Some exemplary operating systems include VMS, MVS, UNIX, OS/2, WINDOWS-NT, OS-400, DOS, etc.

The client stations 106 are interconnected to the subsystem 102 by a network 116. The network 116 may comprise any desired connection, including one or more conductive wires or busses, fiber optic lines, data communication channels, wireless links, internet connections, telephone lines, etc. Preferably, a high speed communication channel such as a T3 link is used, employing a network protocol such as APPC or TCP/IP.

Administrator Stations

The administrator stations 104 comprise electronic equipment for a human or automated storage administrator to convey machine-readable instructions to the subsystem 102. Thus, the stations 104 may comprise processor-equipped general purpose computers or "dumb" terminals, depending upon the specific application.

Data Storage Subsystem: Subcomponents

In an exemplary embodiment, the data storage subsystem 102 may comprise a commercially available server such as an IBM ADSM product. However, since other hardware arrangements may be used as well, a generalized view of the subsystem 102 is discussed below.

The data storage subsystem 102 includes a data processing apparatus 108, having a construction as discussed in greater detail below. The data processing apparatus 108 exchanges signals with the network 116 and the client stations 106 via an interface 112, and likewise exchanges signals with the administrator stations 104 via an interface 110. The interfaces 110/112 may comprise any suitable device for communicating with the implemented embodiment of client station and administrator station. For example, the interfaces 110/112 may comprise ETHERNET cards, small computer system interfaces ("SCSIs"), parallel data ports, serial data ports, telephone modems, fiber optic links, wireless links, etc.

The data processing apparatus 108 is also coupled to a database 113 and a storage hierarchy 114. As discussed in greater detail below, the storage hierarchy 114 is used to store "managed files". A managed file may include an individual user file (stored as such), or multiple constituent user files stored together as an "aggregate" file. The subsystem's storage of user files protects these files from loss or corruption on the client's machine, assists the clients by freeing storage space at the client stations, and also provides more sophisticated management of client data. In this respect, operations of the storage hierarchy 114 include "archiving" files from the client stations 106, "backing up" files of the client stations 106 contained in the storage hierarchy 114, "retrieving" stored files for the client stations 106, and "restoring" files backed-up on the hierarchy 114.

The database 113 contains information about the files contained in the storage hierarchy 114. This information, for example, includes the addresses at which files are stored, various characteristics of the stored data, certain client-specified data management preferences, etc. The contents of the database 113 are discussed in detail below.

More Detail: Exemplary Data Processing Apparatus

Figure 2:
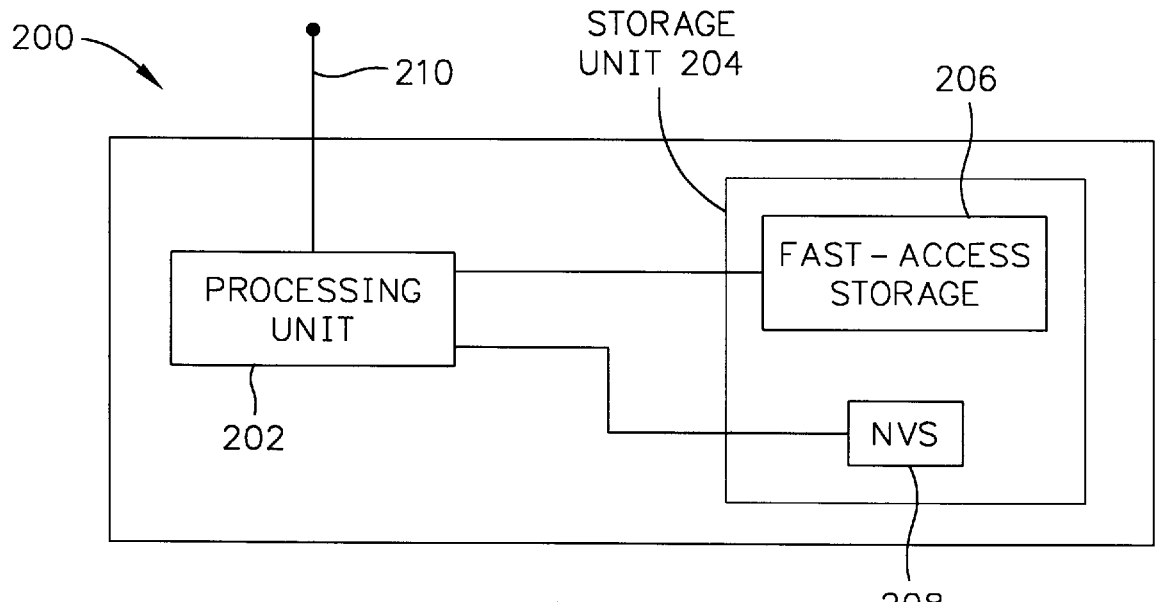
FIG. 2 is a block diagram of a digital data processing machine in accordance with the invention.

The data processing apparatus 108 may be embodied by various hardware components and interconnections. FIG. 2 shows one example, in the form of a digital data processing apparatus 200.

The apparatus 200 includes a processing unit 202, such as a microprocessor or other processing machine, coupled to a storage unit 204. In the present example, the storage unit 204 includes a fast-access storage 206 as well as nonvolatile storage 208. The fast-access storage 206 preferably comprises random access memory, and may be used to store programming instructions executed by the processing unit 202. The nonvolatile storage 208 may comprise, for example, one or more magnetic data storage disks such as a "hard drive", a tape drive, or any other suitable storage device. The apparatus 200 also includes at least one input/output 210, such as a line, bus, cable, electromagnetic link, or other means for exchanging data between the processing unit 202 and other components of the subsystem 102.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206/208 may be eliminated; furthermore, the storage unit 204 may be provided on-board the processing unit 202, or even provided externally to the apparatus 200.

More Detail: Storage Hierarchy

Figure 4:
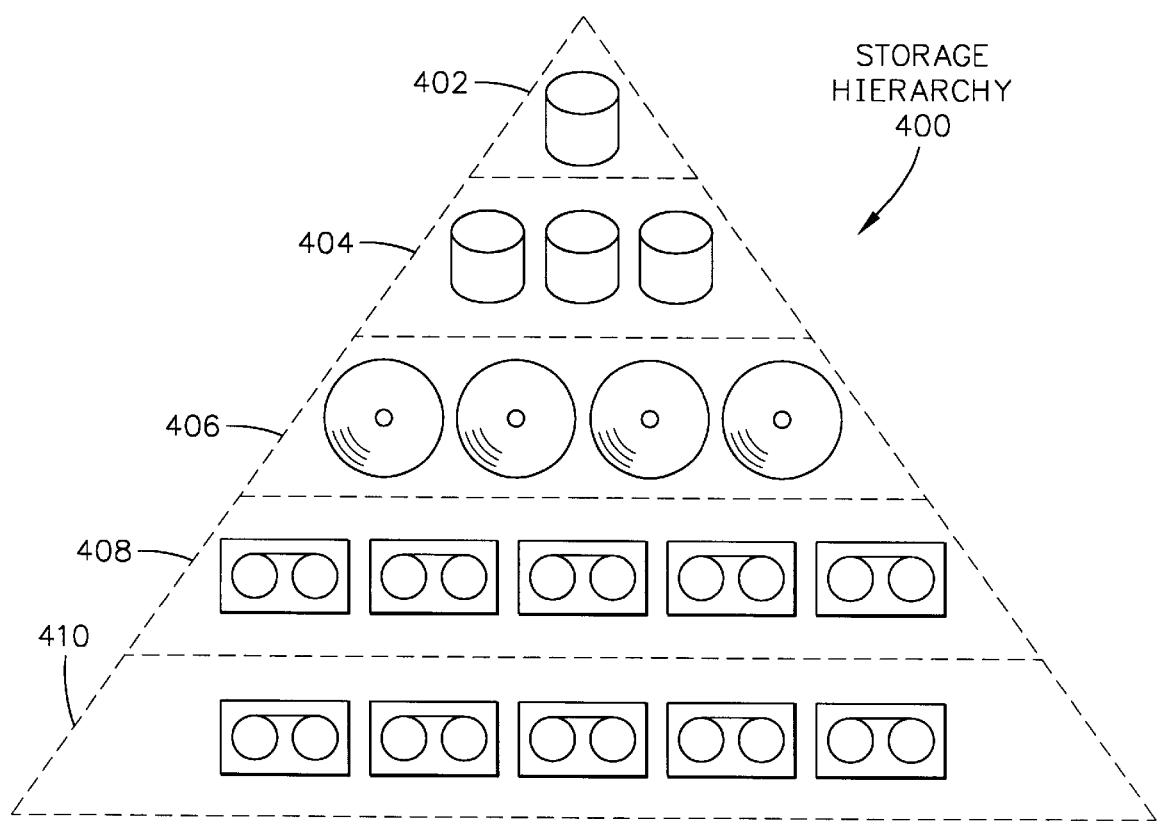
FIG. 4 is a block diagram showing the subcomponents of an illustrative storage hierarchy in accordance with the invention.

The storage hierarchy 114 may be implemented in storage media of various number and characteristics, depending upon the clients' particular requirements. To specifically illustrate one example, FIG. 4 depicts a representative storage hierarchy 400. The hierarchy 400 includes multiple levels 402–410, where successively higher levels represent incrementally higher storage performance. The levels 402–410 provide storage devices with a variety of features and performance characteristics.

In this example, the first level 402 includes high-speed storage devices, such as magnetic hard disk drives, writable optical disks, or other direct access storage devices ("DASDs"). The level 402 provides the fastest data storage and retrieval time among the levels 402–410, albeit the most expensive. The second level 404 includes DASDs with less desirable performance characteristics than the level 402, but with lower expense. The third level 406 includes multiple optical disks and one or more optical disk drives. The fourth and fifth levels 408–410 include even less expensive storage means, such as magnetic tape or another sequential access storage device.

The levels 408–410 may be especially suitable for inexpensive, long-term data archival, whereas the levels 402–406 are appropriate for short-term fast access data storage. As an example, one or more devices in the level 402 and/or level 404 may even be implemented to provide a data storage cache.

Devices of the levels 402–410 may be co-located with the subsystem 102, or remotely located, depending upon the user's requirements. Thus, storage devices of the hierarchy 400 may be coupled to the data processing apparatus 108 by a variety of means, such as one or more conductive wires or busses, fiber optic lines, data communication channels, wireless links, internet connections, telephone lines, SCSI connection, ESCON connect, etc.

Although not shown, the hierarchy 400 may be implemented with a single device type, and a corresponding single level. Ordinarily skilled artisans will recognize the "hierarchy" being used illustratively, since the invention prefers but does not require a hierarchy of storage device performance.

In the context of the storage hierarchy 114/400, the term "storage pool" is used to identify a group of storage devices with similar performance characteristics. For instance, the level 404 may be comprised of several storage pools, each pool including one or more DASDs.

More Detail: Database

Introduction

As mentioned above, the database 113 is used to store various information about data contained in the storage hierarchy 114. This information, for example, includes the addresses at which managed files are stored in the storage hierarchy 114, various characteristics of the stored data, certain client-specified data management preferences, etc.

File Aggregation

One of the key features of the present invention is storage and use of "managed" files, each comprising an aggregation of one or multiple constituent "user" files. The "user" files are created by the client stations 106, and managed by the subsystem 102 as a service to the client stations 106. The subsystem 102's use of managed files, however, is transparent to the client stations 106, which simply regard user files individually. This "internal" management scheme helps to significantly reduce file management overhead costs by using managed files constructed as aggregations of many different user files. In particular, the subsystem 102 treats each managed file as a single file during backup, move, and other subsystem operations, reducing the file management overhead to that of a single file.

Figure 5:
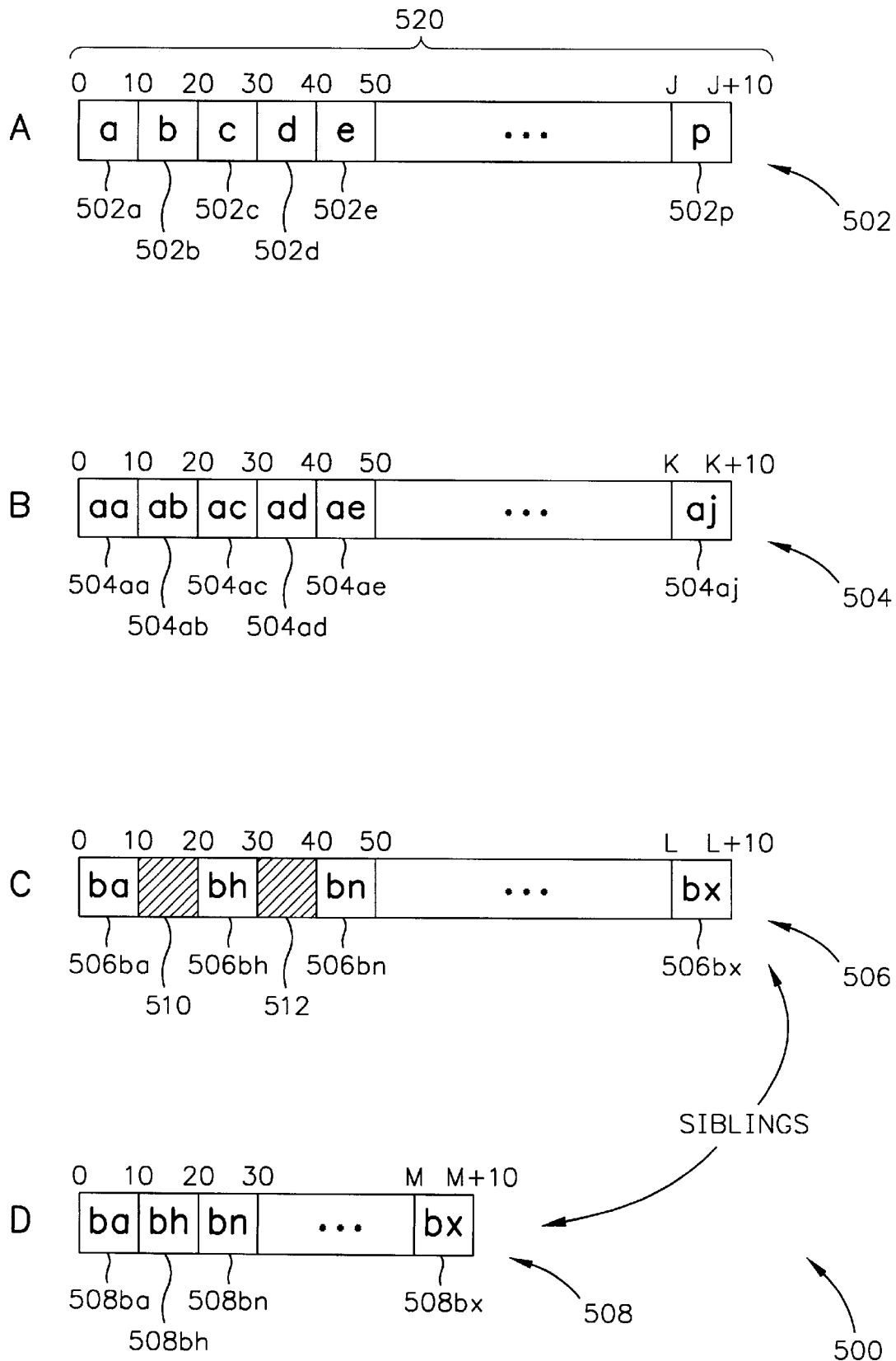
FIG. 5 is a block diagram showing the interrelationship of various illustrative user files and managed files.

FIG. 5 shows an exemplary set of four managed files 502–508. Managed files are also referenced by corresponding alphabetic designators A–D, for simpler representation in various tables shown below. For ease of explanation, upper case alphabetic designators refer to aggregate files, whereas lower case designators point out user files.

The managed file 502 includes multiple user files 502a–502p (also identified by alphabetic designators a–p). The user files 502a–502p are preferably stored adjacent to each other to conserve storage space. The position of each user file in the managed file 502 is denoted by a corresponding one of the "offsets" 520. In an exemplary implementation, the offsets may represent bytes of data. Thus, the first user file 502a has an offset of zero bytes, and the second user file 502b has an offset of ten bytes. In the simplified example of FIG. 5, all user files are ten bytes long.

FIG. 5 also depicts other managed files 504, 506, and 508, each including various user files. Managed files 502 and 504 include different sets of user files. In contrast, the managed files 506 and 508 contain completely identical sets of constituent user files. In this example, the managed file 506 contains unused areas 510/512 that were once occupied by user files later detected. As shown in FIG. 5, the files 506ba, 506bh, 506bn . . . 506bx are present in both managed files 506 and 508. In this case, the managed file 508 represents a consolidation of the managed file 506, created by the subsystem 102 during an operation called "reclamation", as discussed below.

Tables

The database 113 is composed of various information including tables that store information about data contained in the storage hierarchy 114. These tables include: an inventory table, a storage table, a mapping table, and a managed file attributes table. Each table provides a different type of information, exemplified in the description below. Ordinarily skilled artisans (having the benefit of this disclosure) will quickly recognize that the tables shown below are merely examples, that this data may be integrated, consolidated, or otherwise reconfigured, and that their structure and contents may be significantly changed, all without departing from the scope of the present invention. For example, instead of tables, this data may be organized as one or more object-oriented databases.

Inventory Table

One table in the database 113 is the inventory table, an example of which is depicted in Table 1 (below). The inventory table contains information specific to each user file stored in the subsystem 102, regardless of the location and manner of storing the user files. Generally, the inventory table cross-references each user file with various "client" information and various "policy" information. More particularly, each user file is listed by its filename, which may comprise any alphabetic, alphanumeric, numeric, or other code uniquely associated with that user file. The inventory table contains one row for each user file.

The client information includes information relative to the client station 106 with which the user file is associated. In the illustrated example, the client information is represented by "client number", "client type", and "source" columns. For each user file, the "client number" column identifies the originating client station 106. This identification may include a numeric, alphabetic, alphanumeric, or other code. In this example, a numeric code is shown. The "client type" column associates the client with one or more predetermined categories, such as different computer types, operating systems, communications parameters, etc. The "source" column lists a location in the client station 106 where the user file is stored locally by the client. As a specific example, a user file's source may comprise a directory in the client station.

In contrast to the client information of Table 1, the policy information includes information concerning the client's preferences for data management by the subsystem 102. Optimally, this information includes the client's preferences themselves, as well as information needed to implement these preferences. In the illustrated example, the policy information is represented by "data retention time" as well as other (not shown) columns, listing a maximum number of backup versions to maintain, timestamps of backed-up data, etc.

TABLE 1

Inventory Table

| USER FILE-NAME | CLIENT NUMBER | CLIENT TYPE | SOURCE | POLICY DATA RETEN-TION TIME | ... |
|---|---|---|---|---|---|
| a | 1 | Unix | /usr | 30 days | |
| b | 1 | Unix | /usr | 30 days | |
| c | 1 | Unix | /usr | 30 days | |
| d | 1 | Unix | /usr | 30 days | |
| e | 1 | Unix | /usr | 30 days | |
| ... | 1 | Unix | /usr | 30 days | |
| p | 1 | Unix | /usr | 30 days | |
| aa | 27 | OS/2 | d:\data | 90 days | |
| ab | 27 | OS/2 | d:\data | 90 days | |
| ac | 27 | OS/2 | d:\data | 90 days | |
| ad | 27 | OS/2 | d:\data | 90 days | |
| ae | 27 | OS/2 | d:\data | 90 days | |
| ... | 27 | OS/2 | d:\data | 90 days | |
| aj | 27 | OS/2 | d:\data | 90 days | |
| ba | 3 | Windows '95 | c:\data | 365 days | |
| bh | 3 | Windows '95 | c:\data | 365 days | |
| bn | 3 | Windows '95 | c:\data | 365 days | |
| bx | 3 | Windows '95 | c:\data | 365 days | |

Storage Table

Another table in the database 113 is the storage table, an example of which is depicted in Table 2 (below). In contrast to the inventory table (described above), the storage table contains information about where each managed file is stored in the storage hierarchy 114. The storage table contains a single row for each managed file.

In the illustrated example, the storage table includes "managed filename", "storage pool", "volume", "location", and other columns. The "managed filename" column lists all managed file's filenames. Like the user files, each managed file has a filename that comprises a unique alphabetic, alphanumeric, numeric, or other code. For each managed file, the "storage pool" identifies a subset of the storage hierarchy 114 where the managed file resides. As mentioned above, each "storage pool" is a group of storage devices of the storage hierarchy 114 having similar performance characteristics. For instance, each of the DASDs 402, DASDs 404, optical disks 406, tapes 408, and tapes 410 may be divided into one or more storage pools. Identification of each storage pool may be made by numeric, alphabetic, alphanumeric, or another unique code. In the illustrated example, numeric codes are used.

The "volume" column identifies a sub-part of the identified storage pool. In the data storage arts, data is commonly grouped, stored, and managed in "volumes", where a volume may comprise a tape or a portion of a DASD. The "location" column identifies the corresponding managed file's location within the volume. As an example, this value may comprise a track/sector combination (for DASDs or optical disks), a tachometer reading (for magnetic or optical tape), etc.

TABLE 2

Storage Table

| MANAGED FILENAME | STORAGE POOL | VOLUME | LOCATION | ... |
|---|---|---|---|---|
| A | 1 | 39 | 1965 | |
| B | 1 | 39 | 1967 | |
| C | 1 | 2 | 16495 | |
| D | 2 | 11 | 1818 | |

Mapping Table

Another table in the database 113 is the mapping table, an example of which is depicted in Table 3 (below). Generally, this table operates to bidirectionally cross-reference between managed files and user files. The mapping table identifies, for each managed file, all constituent user files. Conversely, for each user file, the mapping table identifies one or more managed files containing that user file. In this respect, the specific implementation of Table 3 includes a "managed→user" column and a "user→managed" column.

The "managed→user" column contains multiple rows for each managed file, each row identifying one constituent user file of that managed file. Each row identifies a managed/user file pair by the managed filename ("managed filename" column) and the user filename ("user filename").

Conversely, each row of the "user→managed" column lists a single user file by its name ("user filename" column), cross-referencing this user file to one managed file containing the user file ("managed filename"). If the user file is present in additional managed files, the mapping table contains another row for each additional such managed file. In each row, identifying one user/managed file pair, the row's user file is also cross-referenced to the user file's length ("length" column) and its offset within the aggregated file of that pair ("offset" column). In this example, the length and offset are given in bytes.

TABLE 3

Mapping Table

| (MANAGED -> USER) | | (USER -> MANAGED) | | | |
|---|---|---|---|---|---|
| MANAGED FILENAME | USER FILE-NAME | USER FILE-NAME | MANAGED FILENAME | LENGTH | OFF-SET |
| A | a | a | A | 10 | 0 |
| | b | b | A | 10 | 10 |
| | c | c | A | 10 | 20 |
| | d | d | A | 10 | 30 |
| | e | e | A | 10 | 40 |
| | ... | ... | A | 10 | ... |
| | p | p | A | 10 | J |
| | | aa | B | 10 | 0 |
| B | aa | ab | B | 10 | 10 |
| | ab | ac | B | 10 | 20 |
| | ac | ad | B | 10 | 30 |
| | ad | ae | B | 10 | 40 |
| | ae | ... | B | 10 | ... |
| | ... | aj | B | 10 | K |
| | aj | ba | C | 10 | 0 |
| | | ba | D | 10 | 0 |

TABLE 3-continued

Mapping Table (MANAGED -> USER)

| MANAGED FILENAME | USER FILE-NAME | USER FILE-NAME | MANAGED FILENAME | LENGTH | OFF-SET |
|---|---|---|---|---|---|
| C | ba | bh | C | 10 | 20 |
|   | bh | bh | D | 10 | 10 |
|   | bn | bn | C | 10 | 40 |
|   | ... | bn | D | 10 | 20 |
|   | bx | ... | ... | 10 | ... |
| D | ba | bx | C | 10 | L |
|   | bh | bx | D | 10 | M |
|   | bn |   |   |   |   |
|   | ... |   |   |   |   |
|   | bx |   |   |   |   |

Managed File Attributes Table

Another table in the database 113 is the managed file attributes table, an example of which is depicted in Table 4 (below). This table accounts for the fact that, after time, a managed file may contain some empty space due to deletion of one or more constituent user files. As explained below, the subsystem 102 generally does not consolidate a managed file upon deletion of one or more constituent user files. This benefits the efficient operation of the subsystem 102, by minimizing management of the aggregate files.

Instead, to conserve storage space, the invention performs "reclamation" to remove unused space between and within managed files. This procedure, discussed below, relies upon knowledge of managed file attributes, as maintained in the managed file attributes table.

Each row of the managed file attributes table represents a different managed file, identified by its managed filename ("managed filename" column). A row's managed file is cross-referenced to columns specifying the managed file's original size upon creation ("original size"), present size not including deleted user files ("active size"), and number of non-deleted user files ("active files").

Other Tables

The database 113 may also be implemented to include a number of other tables, if desired, the content and structure being apparent to those of ordinary skill in the art (having the benefit of this disclosure). Some or all of these tables, for instance, may be added or incorporated into various existing tables discussed above. In a preferred embodiment, the database 113 includes a backup directory table (not shown) that indicates whether, for storage pool backup operations, each device or medium in the storage hierarchy 114 is designated as a primary device, designated as a backup device, or has no designation yet.

TABLE 4

Managed File Attributes Table

| MANAGED FILENAME | ORIGINAL SIZE | ACTIVE SIZE | ACTIVE FILES |
|---|---|---|---|
| A | J + 10 | J + 10 | 16 |
| B | K + 10 | K + 10 | 10 |
| C | L + 10 | M + 10 | 13 |
| D | M + 10 | M + 10 | 13 |

OPERATION

In addition to the various hardware embodiments described above, a different aspect of the invention concerns a method of storing and using "managed" files, implemented using hardware components such as those disclosed above. As discussed below, each managed file comprises an aggregation of one or multiple individual "user" files, thus reducing file management overhead costs.

Signal-Bearing Media

More specifically, in the context of FIGS. 1-2 the method aspect of the invention may be implemented, for example, by operating the data processing apparatus 108 (embodied by a digital data processing apparatus 200), to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method of storing and using "managed" files, each comprising an aggregation of one or multiple individual "user" files, in order to reduce file management overhead costs.

Figure 3:
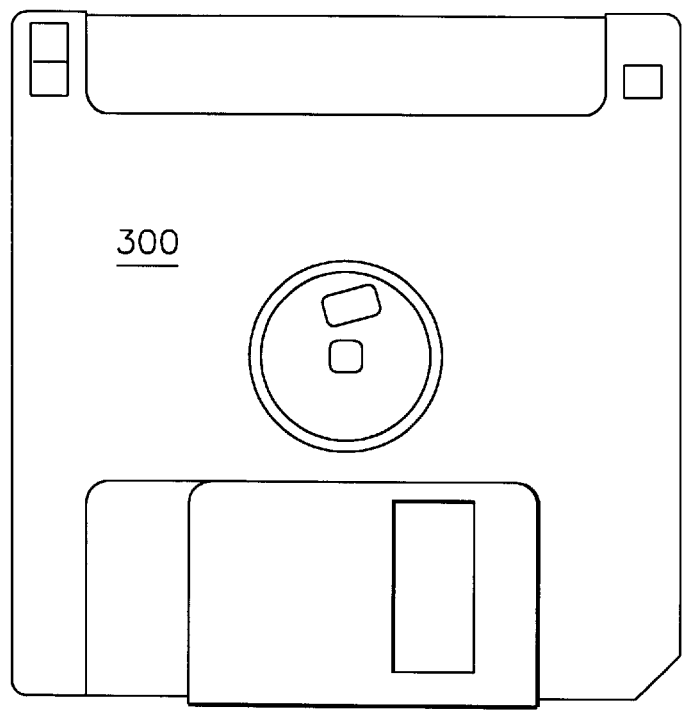
FIG. 3 shows an exemplary signal-bearing medium in accordance with the invention.

Illustratively, this signal-bearing media may comprise RAM (not shown) contained within the data processing apparatus 108, as represented by the fast-access storage 206 for example. Alternatively, the instructions may be contained in another signal-bearing media, such as a magnetic data storage diskette 300 (FIG. 3), directly or indirectly accessible by the processing unit 202. Whether contained in the digital data processing apparatus 200 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as C, C++, PLX, etc.

File Aggregation: General Sequence

Figure 6:
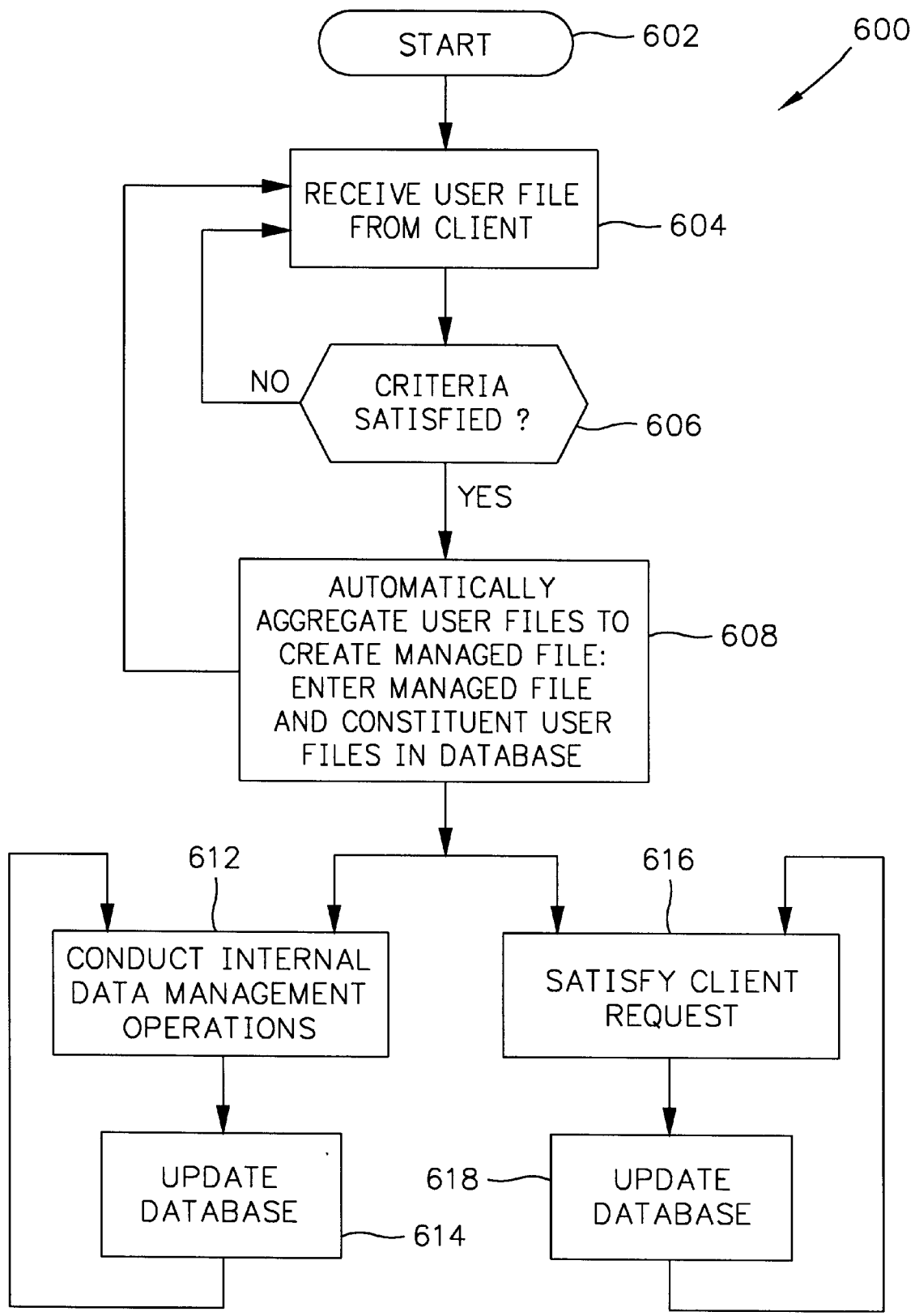
FIG. 6 is a flowchart of an operational sequence for data storage subsystem management with file aggregation.

FIG. 6 shows an operational sequence 600 to broadly illustrate the method aspect of the invention, according to one example of the invention. For ease of explanation, but without any limitation intended thereby, the sequence 600 of FIG. 6 is described in the context of the hardware of FIGS. 1–5, described above. After the sequence 600 is initiated in step 602, the subsystem 102 receives a user file from one of the client stations 106 in step 604.

Next, in step 606, the data processing apparatus 108 asks whether, having received the user file, predetermined criteria necessary to complete a managed file are now satisfied. These predetermined criteria, details of which are discussed below, determine how many user files go into the current aggregate file being created. If the criteria are satisfied, the processing apparatus 108 in step 608 creates a managed file. Otherwise, control returns to step 604 to receive another user file.

The predetermined criteria of step 606 may be implemented in a number of different ways, depending upon the needs of the application. For example, the criteria may comprise receipt (step 604) of a predetermined number of user files. For instance, a managed file may be created by including every ten user files received. In another example, the criteria may be specified by a client station 106, which manually identifies desired user files for inclusion into a managed file. In another example, the criteria may specify a target managed file size; when enough user files have been received to provide the desired size of managed file, the managed file is completed.

In still another example, the criteria may be established to coincide with a "commit transaction". Namely, the subsystem 102 may be implemented, aside from file aggregation, to delay commitment of data storage operations in the hierarchy 114 for a group of received user files until occurrence of a predetermined "commit" event. In this case, the predetermined criteria of step 606 may be designed to make managed files coincide with each group of user files together committed to storage. Under this arrangement, user files may be written to the storage hierarchy 114 upon receipt, with commitment being effectuated by representing the file in the database 113.

The criteria may also consider other factors, for example grouping received user files according to their location within a client station 106. As a further enhancement, the predetermined criteria of step 606 may recognize certain types of user files as being appropriate for being the sole user file in a managed file. Moreover, ordinarily skilled artisans (having the benefit of this disclosure) will recognize many completely different criteria suitable for step 606, without departing from the scope of this invention. Such criteria may further involve combinations and/or variations of such different criteria as well as the criteria discussed above.

When the predetermined criteria are satisfied, step 608 creates a managed file from the user files meeting the criteria. This step is performed by updating the database 113 to recognize the constituent user files (meeting the criteria) as a single managed file. In particular, the subsystem 102 in step 608 enters a representation of the newly created managed file and its constituent user files in the database 113. This involves entering: (1) the user files in the inventory table (e.g., Table 1, shown above), (2) the managed file in the storage table (e.g., Table 2, shown above), (3) the managed file and its constituent user files in the mapping table (e.g., Table 3, shown above), and (4) the managed file in the managed file attributes table (e.g., Table 4, shown above).

After step 610, the newly created managed file is available to participate in internal data management operations, and to satisfy client requests. More particularly, the managed file (and the previously created managed files), may be used to satisfy client requests as shown in step 616. Client requests may include many operations, such as user file delete, client retrieve, and client restore. These operations are discussed in greater detail below.

A representative client request is a "user file retrieve". This operation is initiated when the subsystem 102 receives a retrieval request from a client station 106, identifying a desired user file. In response, the subsystem 102 employs the mapping table to determine the identified user file's location within its managed file. Then, referencing the identified user file's location in the managed file, the subsystem 102 obtains a copy of the identified user file from the storage hierarchy 114. Finally, the subsystem 102 provides a copy of the sought user file to the requesting client station 106.

After step 616, step 618 is performed. Namely, if a client request renders the database 113 incomplete or incorrect, step 618 updates the database 113. For example, if a client request deletes a user file, step 618 deletes the user file from the inventory and mapping tables, and updates the managed file attributes table to show updated "active size" and "active files" data. After step 618, step 616 repeats to satisfy the next client request.

In contrast to the client requests (step 616), new and previously created managed files may also be involved in internal data management operations (step 612). A representative example of internal data management operations is an internal managed file copy operation, which may be performed as part of various other operations, such as data migration, reclamation, storage pool backup, and storage pool restore, each discussed in greater detail below. Particularly, in an internal managed file copy operation a managed file is copied as a contiguous unit from a first location in the data storage hierarchy 114 to a second location in the data storage hierarchy 114.

After step 612, step 614 is performed. Namely, if an internal data management operation renders the database 113 incomplete or incorrect, step 614 updates the database 113. For example, if a management operation consolidates a managed file, step 614 updates the storage table, mapping table, and managed file attributes table. After step 612, step 614 repeats to satisfy the next internal data management operation.

Satisfying Client Requests

Figure 7:
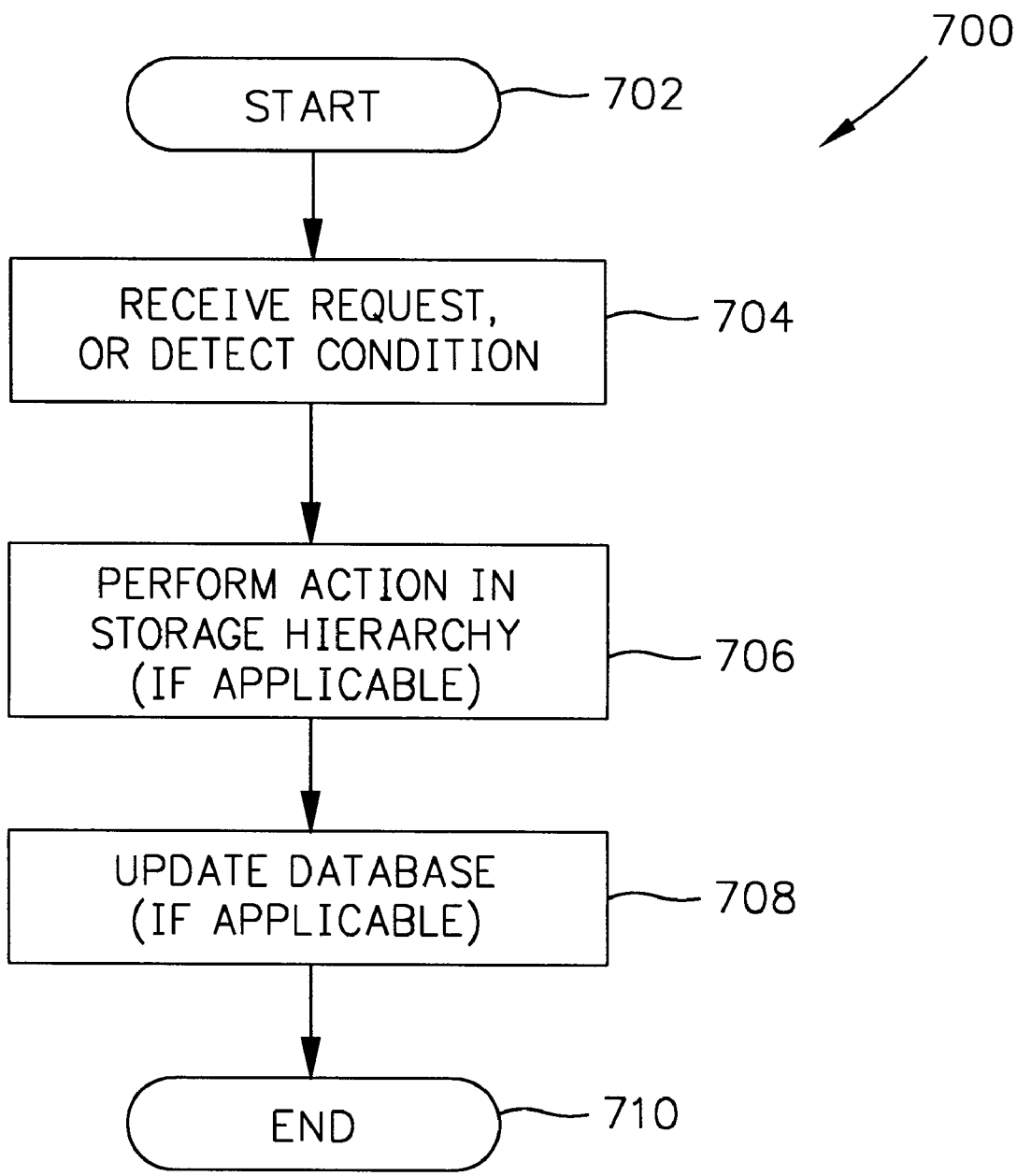
FIG. 7 is a flowchart of a general operational sequence for processing client requests and internal data management operations, in accordance with the invention.

As mentioned above, managed files may be used to satisfy various client requests, as shown in step 616 (FIG. 6). These processes are further illuminated with the following specific examples. FIG. 7 shows a broadly applicable operational sequence 700 to illustrate these examples. For ease of explanation, but without any limitation intended thereby, the sequence 700 of FIG. 7 is described in the context of FIGS. 1–6, described above. Although these operations analogously apply to managed files composed of a singly stored user file, the following discussions are aimed primarily at managed files composed of aggregated user files to illustrate some of the features and advantages of the invention.

Client Archive

In this operation, a client station 106 sends one or more user files for storage by the subsystem 102. As shown in FIG. 7, the interface 112 in step 704 receives a client request comprising an archive request. Also in step 704, the interface 112 receives a user file for archival.

Next, in step 706 the subsystem 102 performs the requested archival action by storing the user file in the storage hierarchy 114. As discussed above, various techniques may be employed to determine where files are stored in the storage hierarchy 114/400 (FIG. 4). In step 708, the subsystem 102 determines whether receipt of the user file satisfies predetermined criteria (as discussed above). If so, the processing apparatus 108 proceeds to create a managed file, as discussed above.

Specifically, step 708 enters a representation of the newly created managed file and its constituent user files in the database 113. More particularly, step 708 enters: (1) the user files in the inventory table (e.g., Table 1, shown above), (2) the managed file in the storage table (e.g., Table 2, shown above), (3) the managed files and its constituent user files in the mapping table (e.g., Table 3, shown above), and (4) the managed file in the managed file attributes table (e.g., Table 4, shown above).

After step 708, the client archive operation is complete, and the routine 700 ends in step 710.

Client Retrieve ("User File Retrieve")

In this operation, a client station 106 requests the subsystem 102 to retrieve a user file archived on the subsystem 102. Referring to FIG. 7, the operation is initiated in step 704 when the subsystem 102 receives a retrieval request from a client station 106, identifying a desired user file. In response, the subsystem 102 in step 706 employs the mapping table to determine the identified user file's location within one of the managed files; the subsystem 102 also employs the storage table to find where the managed file is stored in the hierarchy 114. Also in step 706, the subsystem 102 obtains a copy of the identified user file from the storage hierarchy 114. Continuing in step 706, the subsystem 102 provides a copy of the requested user file to the requesting client station 106.

As no action is required by step 708, the routine 700 ends in step 710.

Client Delete

In this operation, a client station 106 requests the subsystem 102 to delete an individual user file stored on the subsystem 102. Referring to FIG. 7, the operation begins in step 704 when the subsystem 102 receives a client delete request from a client station 106, identifying a desired user file. No action involving the requested file is performed in the storage hierarchy 114 (step 706).

However, in step 708 the subsystem 102 deletes appearance of the user file from the inventory table (e.g., Table 1) and mapping table (e.g., Table 3). Following this, the data processing apparatus 108 must also access the mapping table to determine whether the recently deleted user file was the managed file's last remaining file. If so, the data processing apparatus 108 also updates the database 113 by deleting appearance of the managed file in the storage table, mapping table, and managed file attributes table.

In contrast, if other user files still remain in the managed file, the data processing apparatus 108 updates the managed file attributes table (e.g., Table 4). This involves computing the active size and number of active files of the managed file affected by the deletion. The computed numbers are input into the managed file attributes table in step 708.

After step 708, the client delete operation is complete, and the routine 700 ends in step 710. Despite deletion of user files from an aggregate file, the remaining (non-deleted) user files retain their same relative order.

Client Backup

In this operation, a client station 106 supplies data for the subsystem 102 to maintain and also manage as a "backup" copy. This is in contrast to the archive operation, in which client stations 106 generally use the subsystem 102 as a remote data storage device.

With client backup, the routine 700 (FIG. 7) involves nearly the same steps as client archive operation (discussed above). However, in addition to the routine 700, the subsystem 102 conducts further operations to automatically maintain and manage multiple backup versions of data. The maintenance of such data may involve, for example, considerations such as the selection of separately fault-tolerant sections of the storage hierarchy 400 for storage of different "versions" of the data. The management of backup data may also involve, for example, automatically determining when to trigger a delete operation to remove client backup copies. This determination, for example, may be made in consideration of the data's age, version number, etc.

Client Restore

In this operation, a client station 106 requests the subsystem 102 to restore one or more user files from a backup copy maintained on the storage hierarchy 114. Presumably, a client station initiates a client restore operation as a result of destruction, loss, or other damage to user files.

With client restore, the routine 700 (FIG. 7) involves nearly the same steps as client retrieve operation (discussed above). However, since multiple versions may exist, the subsystem 102 must automatically identify the optimal version from which to conduct restoration. As an example, the subsystem 102 may select a most recent backup version to use as a restoration source.

Cache Use

The subsystem 102 may include one or more cache units (not shown), preferably comprising fast-access memory such as RAM. In such implementations, one application of the cache is to expedite updates to the database 113 (e.g., step 708, FIG. 7). For example, the data processing apparatus 108 may cache a storage table entry for a managed file whenever a client requests access to any user file within that managed file. Such client access may include, for example, client delete, client retrieve, and other operations. This cache operation anticipates future operations performed upon other user files in the same managed file.

A different application of the cache is to cache managed files themselves to expedite access to these files.

Internal Data Management Operations

In addition to their involvement in satisfying user requests, managed files may also be involved in various internal data management operations (e.g., step 612, FIG. 6). These processes are further illuminated with the following specific examples, explained with the aid of the broadly applicable operational sequence 700 (FIG. 7). For ease of explanation, but without any limitation intended thereby, the following references to FIG. 7 are described in the context of FIGS. 1–6, described above. Although these operations analogously apply to singly stored user files, the following discussions are aimed primarily at aggregate files to illustrate some of the features and advantages of the invention.

Managed File Copy

This operation involves copying a managed file from one location to another in the storage hierarchy 114. This operation is a necessary part of many other operations, such as migration, reclamation, storage pool backup, and storage pool restore. Advantageously, managed file copy is performed with drastically reduced file management overhead costs because many constituent user files are treated as a single aggregate file. This is possible because, in a managed file copy operation, a managed file is copied as a contiguous unit from a source location in the data storage hierarchy 114 to a second target in the data storage hierarchy 114. This operation is facilitated by the structure of the database 113, which permits treatment of the managed file as a single file.

Referring to FIG. 7, a managed file copy operation 700 starts in response to various conditions (step 704), such as the need to copy files during migration, storage pool restoration, storage pool backup, etc. Accordingly, in step 706 the subsystem 102 copies the designated managed files from a source location to a target location in the storage hierarchy 114. In some cases, this copy operation may be followed by a deletion of the original managed files, thereby effecting a "move" operation.

After step 706, the subsystem 102 updates the database 113 in step 708 to reflect certain new information regarding the managed files. Particularly, updates are made to the storage table to add the managed file's new storage location After step 708, the managed file copy operation is complete, and the routine 700 ends in step 710.

User File Identification

This operation involves identifying all constituent user files of a managed file. This operation may be performed as a subset of various operations conducted in the subsystem 102.

Referring to FIG. 7, a user file identification operation 700 starts in response to an internal request from a sub-process occurring in the subsystem 102. This request submits a managed file for which identification of all constituent user files is desired. (Optionally, the request may emanate from a client station 106, however the use of managed files are invisible to the client stations 106 in the illustrated embodiment.)

In step 706 the subsystem 102 performs action by accessing the database 113. In particular, the data processing apparatus 108 accesses the "managed→user" section of the mapping table (e.g., Table 3). Inputting the desired managed file yields all cross-referenced user files. Also in step 706, the data processing apparatus 108 provides the identified user files as an output to the requesting process.

After step 706, no action is needed in step 708. Accordingly, the user file identification operation is complete, and the routine 700 ends in step 710.

Managed File Move

This operation involves moving an entire managed file from one location to another in the storage hierarchy 114, and updating the database 113 accordingly. This operation is a necessary part of other operations, such as migration, reclamation, etc. Advantageously, managed file move involves significantly reduced file management overhead costs, due to the treatment of all constituent user files as a single aggregate file.

Referring to FIG. 7, a managed file move operation 700 may start in response to (1) receiving a request, e.g. from a sub-process being performed by the subsystem 102, or (2) detecting a condition, e.g. as a result of analysis determining when file movement is proper, such as automatic data migration (discussed below) based on criteria such as data age, level of use, etc.

In step 706, the subsystem 102 copies the designated managed file from one location to another in the storage hierarchy 114. Next, the database 113 is updated to remove reference to the original location of the managed file. Particularly, updates are made to the storage table to add the managed file's new storage location and delete the old location.

After step 708, the managed file move operation is complete, and the routine 700 ends in step 710.

Internal Delete

This operation deletes a user file in the same way that the client delete operation works, as discussed above. However, this operation starts in response to an internal subsystem 102 request rather than a client request.

Managed File Delete

To delete an entire managed file, each constituent user file is identified with the user file identification operation, discussed above. Then, each user file is deleted individually with a separate internal delete operation, as discussed above.

Migration

Referring to FIG. 4, this operation moves files from higher levels (e.g. 402, 404) to lower levels (e.g., 408, 410) in the storage hierarchy 400. Migration movement is preferably "downward" relative to FIG. 4, thereby moving files from more expensive to less expensive storage devices. In some cases, however, migration movement may be "upward" relative to FIG. 4. This may occur, for example, in response to recent, frequent, or anticipated use of the files.

Referring to FIG. 7, a migration operation 700 preferably starts automatically in response to the existence of a predetermined condition (step 704). As an example, this condition may be related to the data's recency of use, frequency of use, age, etc. Step 704 identifies each managed file to be migrated.

In response to the condition of step 704, subsystem 102 in step 706 copies the identified managed files from their original locations to various target locations in the storage hierarchy 114. The target locations may be selected under many different techniques, considering factors such as the size of the data, availability of potential target locations, etc.

After step 706, the subsystem 102 updates the database 113 to reflect the new locations of the managed files. Particularly, updates are made to the storage table to add the managed file's new storage location and delete the old location. Since the number or relative arrangement of user files is not changed during the move, updates are not needed to the mapping table or the managed file attributes table.

After step 708, the migration operation is complete, and the routine 700 ends in step 710.

Reclamation

This operation is automatically performed by the subsystem 102 to more compactly rewrite a unit of data storage, such as a volume, eliminating unused storage space between managed files and also consolidating aggregate files that contain unused space due to previously deleted user files. The consolidation of an aggregate file is called "reconstruction". Referring to FIG. 7, a reclamation operation starts in step 704 when the subsystem 102 detects existence of certain conditions. As an example, these conditions may include the presence of a threshold amount of wasted space among managed files in a particular data storage unit, volume, device, etc.

After step 704, the subsystem 102 consolidates the inefficiently stored managed files. As shown below, this is best implemented by moving the managed files to adjacent locations in the storage hierarchy 114, and concurrently consolidating managed files containing unused space. Next, in step 708 the subsystem 102 updates the database to reflect the results of this reclamation. This update involves changes to (1) the storage table, to indicate where each new managed file is now stored; (2) the mapping table, to accurately display the new user file offsets within their managed files; and (3) the managed file attributes table, to show each managed file's new "original size" and matching "active size".

After step 708, the reclamation process 700 is complete, and it ends in step 710. Despite reconfiguration of the aggregate file during reclamation, its user files always retain their same relative order.

Storage Pool Backup

This operation is performed by the subsystem 102, invisible to the client stations 106, to backup its own data. Each storage pool backup operation is performed for one of the "storage pools" of the storage hierarchy 114. As mentioned above, each "storage pool" preferably identifies a different group of storage devices with similar performance characteristics. For instance, referring to FIG. 4, the level 404 may be comprised of several storage pools, each pool including one or more similar DASDs. The storage pools are preferably assigned when the system 100 is originally installed or subsequently reconfigured.

Referring to FIG. 7, a storage pool backup operation 700 is performed in response to various conditions (step 704). These conditions may be linked to characteristics of data stored in the pool (e.g., age, frequency of use, age of most recent backup, etc.), and serve to identify a storage pool ready for backup. Storage pool backup may also be initiated based upon a predetermined time schedule.

In response to these conditions, the subsystem 102 in step 706 incrementally copies all managed files of the storage pool into a different "target" location in a completely separate storage pool of the storage hierarchy 114. After step 706, the subsystem 102 updates the database 113 to reflect the newly created backup copy. This involves updating the storage table with entry of the new backup data. Also, the backup directory table is updated to designate the devices of the target location as backup devices.

After step 708, the storage pool backup operation is complete, and the routine 700 ends in step 710.

Storage Pool Restore

This operation is performed by the subsystem 102, invisible to the client stations 106, to restore its own data upon a failure. A storage pool restore operation is performed for a failed one of the "storage pools" of the storage hierarchy 114. As mentioned above, each "storage pool" identifies a different group of storage devices with similar performance characteristics.

Referring to FIG. 7, a storage pool restore operation 700 is performed in response to various conditions (step 704). Broadly, these conditions are related to the complete or partial failure of data stored in the pool. Accordingly, these conditions also serve to identify a storage pool suitable for restoration.

In response to these conditions, the subsystem 102 in step 706 identifies a backup copy of the storage pool, formed during a previous storage pool backup operation. This identification is performed using the backup directory table and storage table. Using this backup copy, the subsystem 102 copies all managed files of the backup copy into a different location in a completely separate storage pool of the storage hierarchy 114.

The new files will ultimately replace the files of the original storage pool, which has failed. In particular, after step 706 the subsystem 102 updates the database 113 to reflect the newly restored copy. This is achieved by updating the storage table with entry of the restored data in place of the failed data.

After step 708, the storage pool restore operation is complete, and the routine 700 ends in step 710.

Reclamation: More Detail

Introduction

As mentioned above, the subsystem 102 recognizes various operations such as "client delete" and "internal delete", which delete individual user files. The client delete operation, for example, instructs the subsystem 102 to delete a particular user file from the storage hierarchy 114. As described above, client delete operations are implemented by deleting appearance of the requested user file from the inventory table and mapping table. If no more user files remain in the managed file previously containing the deleted user file, the storage subsystem 102 also updates the database 113 by deleting appearance of the managed file from the storage table, mapping table, and managed file attributes table.

Figure 8:
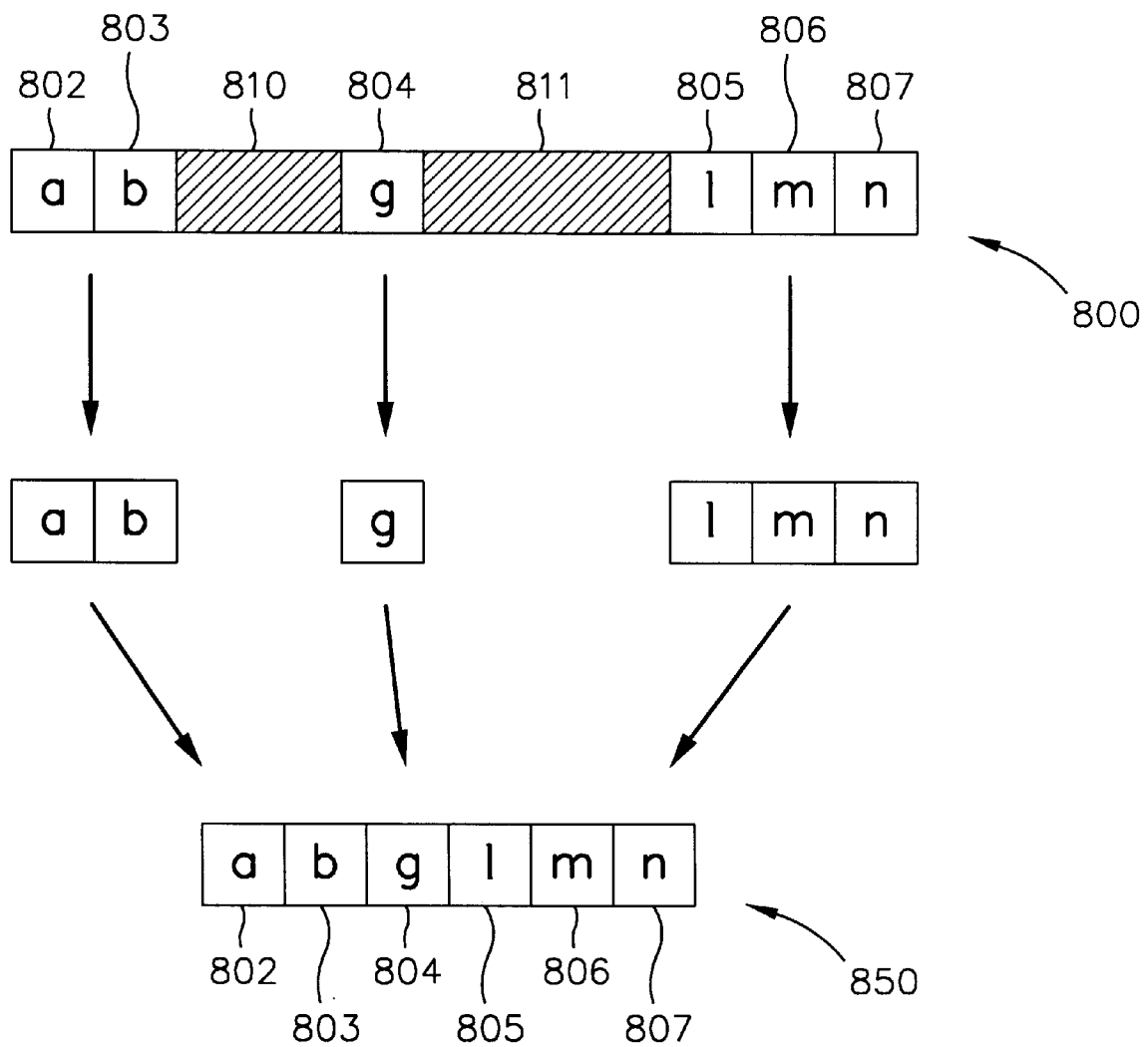
FIG. 8 is a diagram showing the relationship between a managed file with interstitial wasted space, various contiguous regions in the managed file, and the post-reclamation managed file, in accordance with the invention.

Frequently, other user files will remain in a managed file after another user file is deleted. In this case, the managed file attributes table is updated with a newly computed active size and number of active files for the managed file affected by the deletion. After the deletion of several user files from a managed file, the managed file exists in a dispersed state, as shown by the managed file 800 (FIG. 8). Remaining user files, such as files 802–807 are no longer contiguous with each other as a result of deleted files previously occupying spaces 810–811. The spaces 810–811 are referred to as "deleted-file" space.

The deleted-file space 810–811 may be viewed as wasted space. Although data from the deleted user files may still reside there, the deleted-file spaces 810–811 are unused and unreferenced in the database 113. Still, these spaces 810–811 prevent other data from being stored there, because the database 113 regards the managed file as a single block of contiguous storage space. This is why the managed file attributes table contains listings for "original size" and "active size". Despite deleted user files, and correspondingly decreased active size, a managed file retains its original size. Moreover, this problem is perpetuated despite managed file copy operations, since these operations copy managed files with their interstitial spaces intact.

In contrast to deleted-file space, which exists within an aggregate file, wasted space may also exist between managed files. This space, called "inter-file" space, may arise due to deletion of an entire managed file, disperse initial storage of managed files, etc.

There are a number of disadvantages to maintaining managed files with inter-file and deleted-file space in the storage hierarchy 114. First, inter-file and deleted-file space inefficiently use costly storage. Storage customers would prefer to purchase as little storage as possible to fulfill their needs. Furthermore, the storage hierarchy 114 may eventually run out of space, even though it might actually contain considerable empty space. Additionally, in the case of tape media, I/O operations are more costly to administer. A robotic transport mechanism, for example, may have to move tape media more often because otherwise compact data is scattered among many different media items.

The invention introduces the following novel reclamation procedure to address the problem of inter-file and interstitial deleted-file space.

Reclamation: Operational Sequence

Figure 9:
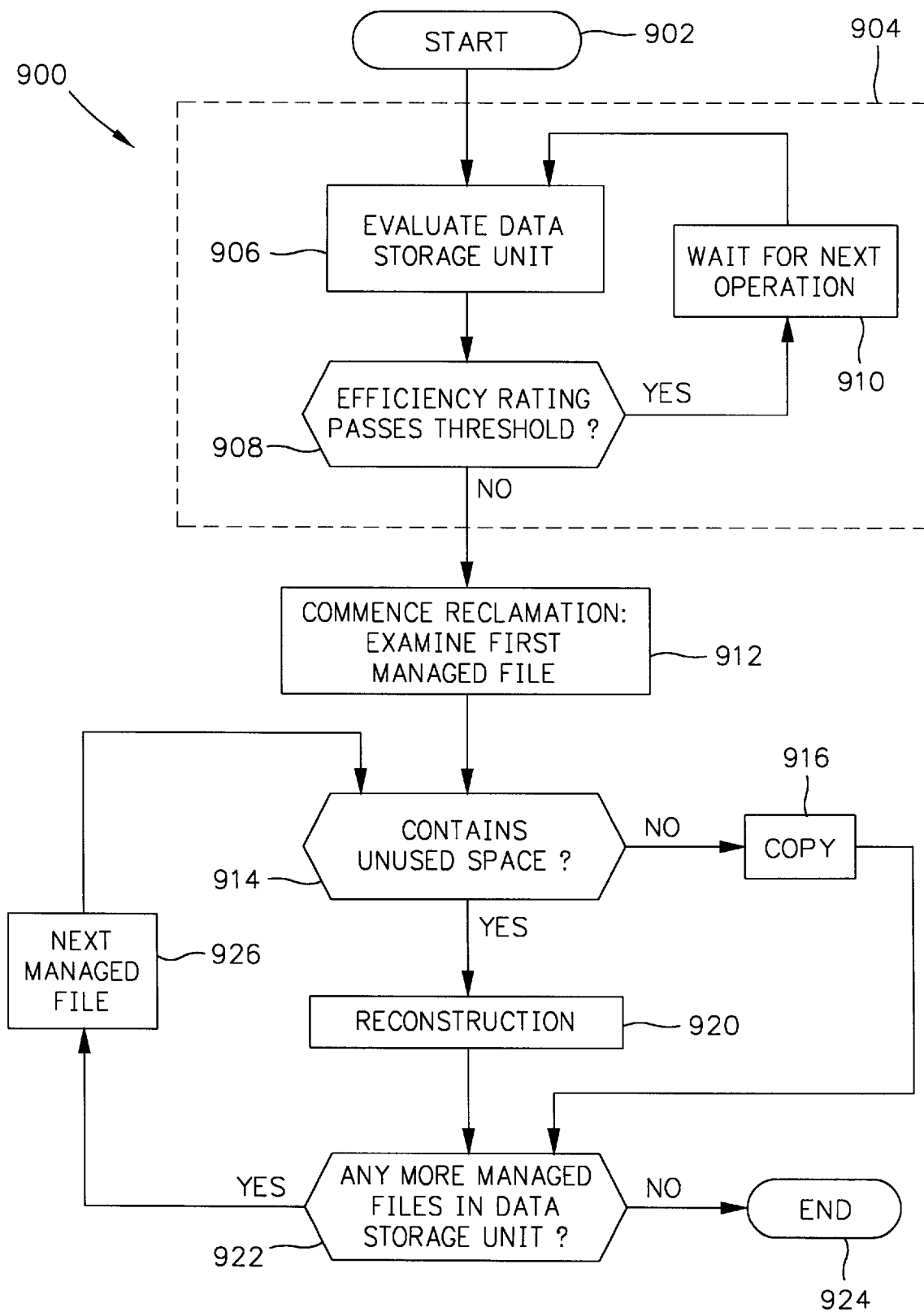
FIG. 9 is a flowchart showing an operational sequence for reclamation of wasted space in managed files, in accordance with the invention.

FIG. 9 shows a sequence of method steps 900 to illustrate an example of the reclamation procedure of the present invention. For ease of explanation, but without any limitation intended thereby, the sequence 900 is described in the context of the other FIGS. 1–8 described above. In the illustrated example, the steps 900 are performed by the data processing apparatus 108. Generally, the sequence 900 operates to evaluate a data storage unit's efficiency, and if warranted, identify and more compactly reconstruct inefficiently stored managed files. The uncompacted managed files are contained in a source area of the storage hierarchy 114. The post-reclamation managed files are stored in a target area of the storage hierarchy 114, which may be the same or a different than the source area. In this example, each of the source and target areas comprise an area of storage, such as a series of adjacent addresses.

After step 902, the reclamation process 900 starts in step 904. In one example, step 904 may be performed in response to various conditions. For example, reclamation may begin in response to expiration of a timer (not shown), or a request received by a client station 106 or an administrator station 104. Also, step 902 may begin automatically when data occupies the storage hierarchy 114 fully, or within a predetermined safety margin. Step 902 may also begin in response to deletion of a user file or a managed file. As still another example, step 902 may begin automatically whenever a change is implemented to the threshold of step 908 (discussed below).

After the steps 900 are initiated in step 902, step 906 evaluates a data storage unit with regard to storage efficiency. The data storage unit may be any convenient unit of storage, such as a physical "volume" (e.g., tape cartridge), logical volume, storage pool, storage device, or even a single managed file. To provide a broadly applicable discussion, this explanation of FIG. 9 utilizes an exemplary data storage unit containing multiple managed files.

The evaluation of step 906 focuses on the volume's storage efficiency. This may be performed in a number of different ways. In the case of a volume, for example, step 906 may compute a ratio as shown in Equation 1, below:

$$\text{efficiency rating} = \text{active occupancy}/\text{total occupancy} \qquad [1]$$

where:
active occupancy=the total space in the volume occupied by non-deleted user files; and
total occupancy=the size of all managed files and single user files in the volume including deleted-file space.

In the case where the data storage unit is a single managed file, the efficiency rating may be computed as shown in Equation 2, below:

$$\text{efficiency rating} = \text{active size}/\text{total size} \qquad [2]$$

where:
active size=the total space within the managed file occupied by non-deleted user files; and
total size ("original size")=the entire size of the managed file upon creation; this amount corresponds to the managed file's overall size now, despite the interstitial vacancies from deleted user files.

After step 906, step 908 determines whether the data storage unit's computed efficiency rating passes a predetermined threshold. This threshold is set according to the user's specifications, e.g. 40% or 60%. If the efficiency rating exceeds the threshold, the data storage unit would not benefit sufficiently from reclamation. In this case, step 910 waits for one of the conditions discussed above (step 902) before restarting step 906. Whenever the efficiency rating fails the threshold, however, reclamation operations commence in step 912.

In contrast to the foregoing description, step 904 may be replaced by a completely different alternative, if desired. For instance, the reclamation of step 912 may begin in response to various conditions apart from evaluation of storage efficiency. For example, reclamation may be performed automatically during operations such as data migration among the storage levels 402–410 (FIG. 4).

Nonetheless, in the illustrated example, where the data storage unit includes multiple managed files, step 912 starts by examining a first managed file therein. The managed file being processed is referred to as the "current" managed file. As an example, this file may be the file with the smallest address in the volume. Step 914 asks whether this managed file is an aggregate file containing any deleted-file space. If not, step 916 copies this managed file to the target location, preferably using an internal managed file copy operation discussed above. As part of the copy step 916, the storage table is updated to show the managed file's new address in the target location. After step 916, the routine 900 advances to steps 922 and 926 to consider the next managed file in the volume.

If step 914 finds the current managed file contains deleted-file space, step 920 "reconstructs" the managed file. The reconstruction process is discussed in greater detail below. Broadly, reconstruction consolidates aggregate files by identifying contiguous regions of user files within the managed file, and then copying all identified contiguous regions to adjacent locations in the target storage area.

Alternatively, step 914 may include an additional prerequisite for reconstruction requiring that the current managed file's efficiency rating (see Equation 2, above) satisfy certain predetermined criteria in order to proceed to reconstruction in step 920. For example, these criteria may require that the managed file's efficiency rating fall short of a predetermined threshold, such as 80%. This threshold value may be the same or different than the threshold used in step 908 as discussed above.

After reconstruction (step 920), step 922 asks whether the data storage unit under evaluation contains any more managed files. If so, the next managed file is selected in step 926, and its analysis begins in step 914. Otherwise, with no more managed files left, the routine 900 ends in step 924.

Reconstruction: Operational Sequence

Figure 10:
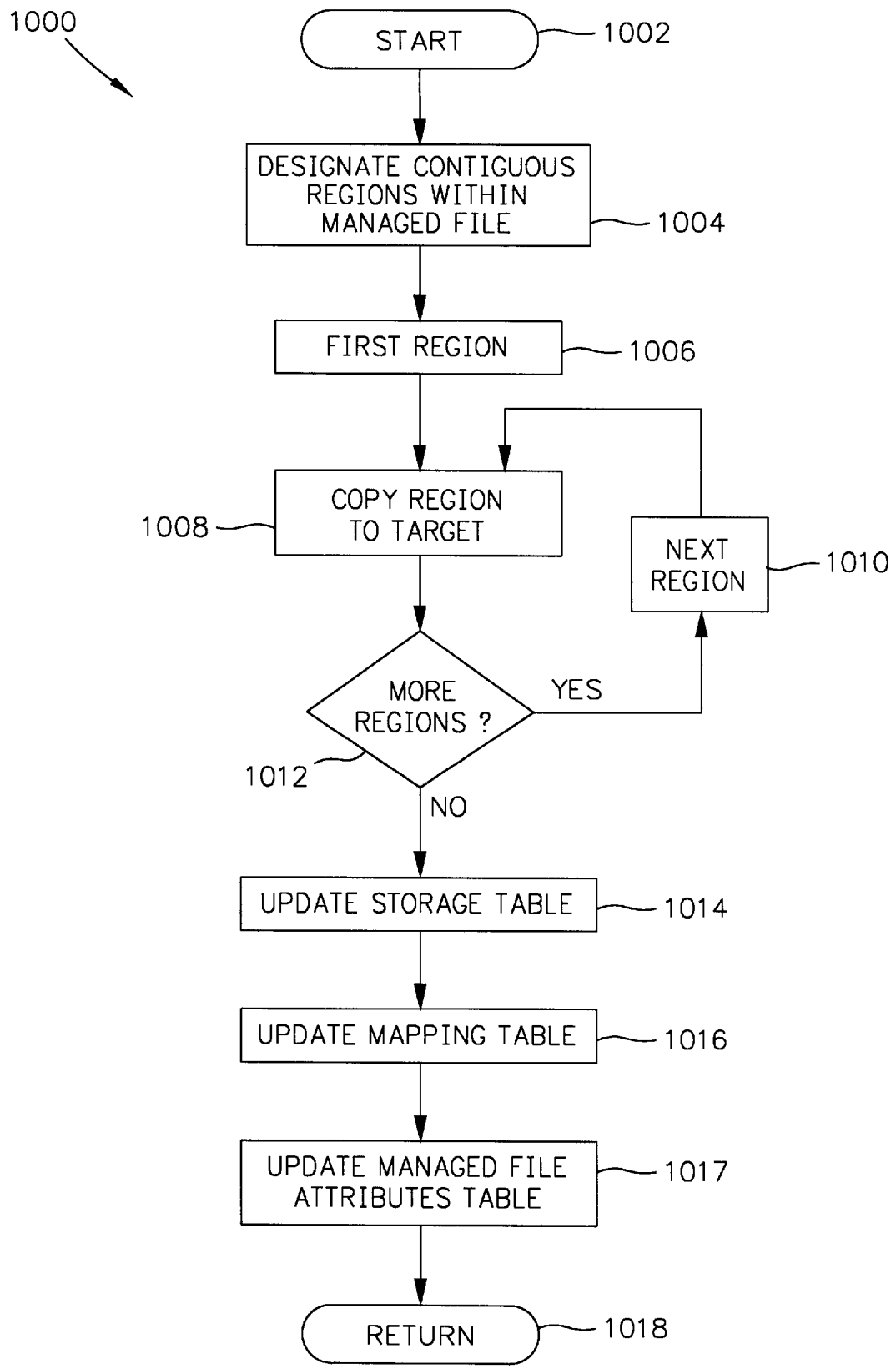
FIG. 10 is a flowchart of a reconstruction sub-process of reclamation, in accordance with the invention.

As mentioned above, reconstruction (step 920, FIG. 9) is the process of consolidating managed files by eliminating any interstitial vacancies left by deleted user files. FIG. 10 shows a sequence of method steps 1000 to illustrate an example of the reconstruction process of the present invention. For ease of explanation, but without any limitation intended thereby, the sequence 1000 is described in the context of the other FIGS. 1–8 described above. Furthermore, the reconstruction process 1000 is explained in an exemplary situation involving reconstruction of the managed file 800 (FIG. 8).

In the illustrated example, the steps 1000 are performed by the data processing apparatus 108. Generally, the sequence 1000 operates to identify contiguous regions of an aggregate containing deleted-file space, and then more compactly reconstruct it in the target area.

The sequence 1000 starts in step 1002; this occurs whenever step 920 (FIG. 9) is performed. In this example, step 920 is activating the routine 1000 to reconstruct the managed file 800 (FIG. 8). Step 1004 first designates contiguous regions within the managed file 800. Each region comprises a contiguous group of one or more user files bounded by a deleted-file space and the beginning/end of the managed file, or sandwiched between two deleted-file spaces. The designation of contiguous regions is achieved by indexing the managed file 800 in the "managed→user" section of the mapping table, along with the mapping table's length and offset information for individual user files in the managed file 800. With the managed file 800, separate contiguous regions are formed from the user files 802–803, 804, and 805–807.

Step 1006 considers a first one of these regions. As an example, the first region may be the region having the smallest address, e.g. the region formed by user files 802–803. The region under consideration is referred to as the "current" region. Step 1008 copies the current region to the target area.

After step 1008, step 1012 asks whether any more regions exist. In the illustrated example, the regions formed by user files 804 and 805–807 still remain. Accordingly, steps 1010 and 1008 sequentially copy the regions 804 and 805–807 to the target location.

After all regions have been copied, the managed file is now in reconstructed form, as shown by 850. Now, step 1014 updates the storage table to display the managed file's new location in the storage hierarchy 114. Similarly, step 1016 updates the mapping table to show the new relationship between the managed file and its now-contiguous user files. Step 1017 updates the managed file attributes table by adding a new entry representing the reconstructed managed file, and also deleting the entry associated with the pre-reconstruction managed file. After step 1017, the routine 1000 returns in step 1018, thereby finishing step 920 (FIG. 9).

Reconstruction Optimization by Using Siblings

Introduction

As mentioned above, reconstruction benefits a data storage subsystem by consolidating managed files that contain deleted-file space formerly occupied by now-deleted user files. Reconstruction is useful for consolidating files created by many different operations, such as client archive, client backup, storage pool backup, etc.

Beneficially, reconstruction can be performed upon a managed file whether that file is being used as a "primary" file or a corresponding client or storage pool "backup" file. Special care is needed, however, when reconstruction is performed to (1) a managed file that has a backup counterpart created in a storage pool backup operation, or (2) a backup counterpart itself. This care is needed to avoid certain problems that may otherwise occur.

Figure 11:
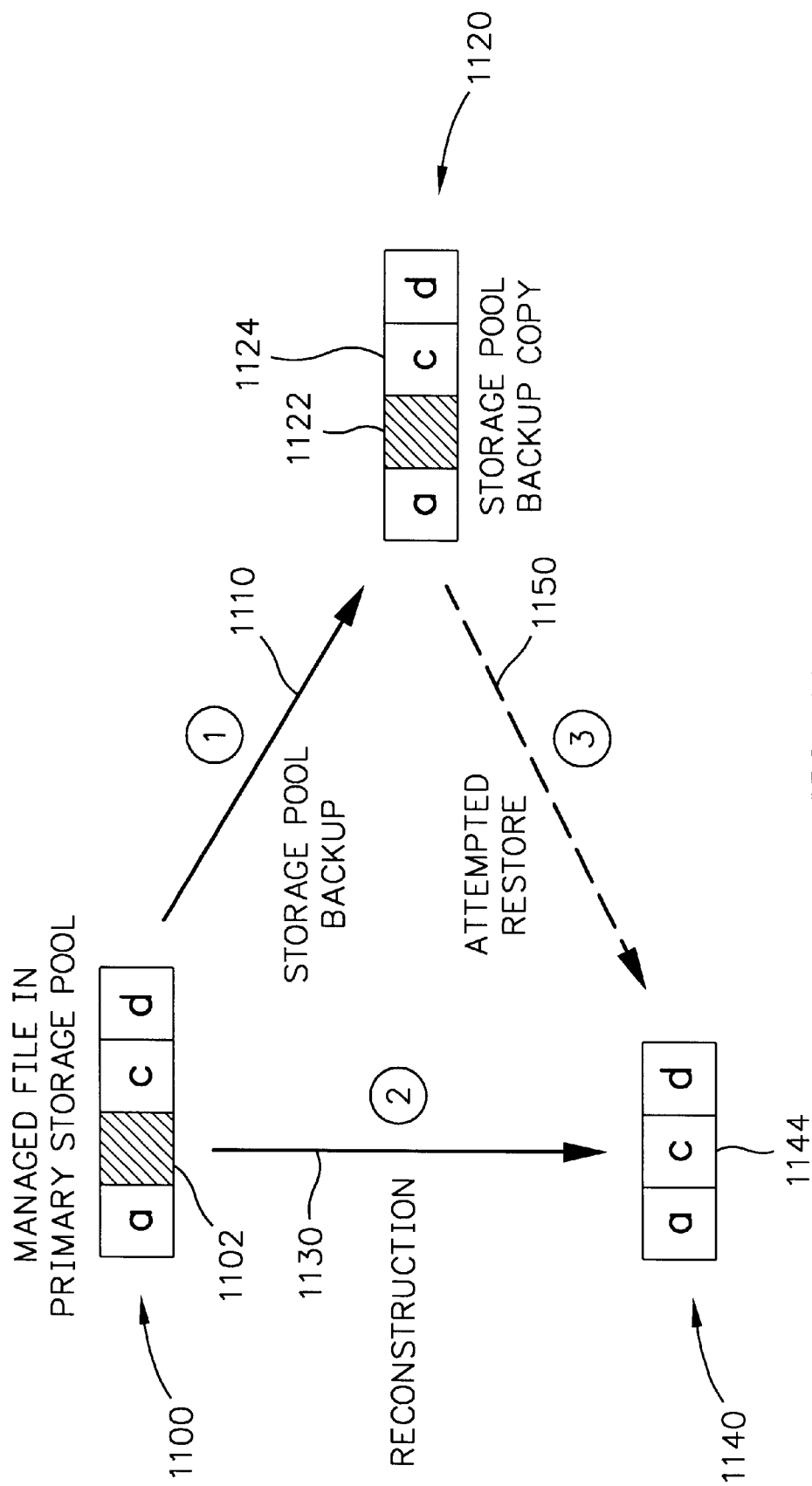
FIG. 11 is a block diagram illustrating a situation where inconsistent primary and backup managed file copies are created, in accordance with the invention.

FIG. 11 illustrates an example of a potential problem involving reconstruction of a primary managed file 1100. The primary managed file 1100 contains deleted-file space 1102 formerly occupied by a now-deleted user file. The primary managed file 1100 is duplicated by a process 1110 such as storage pool backup (as discussed in greater detail above). This creates an identical managed file, called a backup copy 1120. The backup copy 1120 contains the same user files in the same relative positions as the primary managed file 100. The backup copy 1120 also contains deleted-file space 1122 corresponding to the primary managed file's deleted-file space 1102.

In accordance with the storage pool backup procedures of the invention, the backup copy 1120 is considered as another instance of the primary file managed 1100. Accordingly, a separate mapping table entry is not required for the backup copy 1120. Instead, the name of the primary managed file 1100 is re-entered in the storage table to record the backup copy's location in the storage hierarchy 114. Thus, the storage table will indicate two separate instances of the file 1100 in the storage hierarchy 114. The existence of these files as primary and backup copies is indicated by the backup directory table, as discussed above.

Under various circumstances, one of the counterparts 1100–1120 may change relative to the other. In the illustrated example, the primary file 1100 undergoes a reconstruction process 1130, thus creating a new and more compact managed file 1140. Upon creation of the reconstructed managed file 1140, the reconstruction process of the invention as discussed above creates new entries for the file 1140 in the storage, mapping, and managed file attributes tables. When the stale file 1100 is deleted, so are its table entries. This leaves the backup copy 1120 without any relevant mapping information, however, since the mapping table contained a single entry for both files 1100–1120.

This lack of mapping information may be problematic if a user file 1144 from the reconstructed file 1140 later becomes unavailable due to a device failure, storage media imperfection, or another problem. This situation calls for restoration 1150 of the user file 1144 from the backup copy 1120. In the illustrated example, the user file 1144 has a counterpart user file 1124 in the backup copy 1120. If the primary user file 1144 fails, however, restoration of the file 1124 is thwarted by the absence of any mapping table entry for the backup copy 1120. As stated above, the mapping table contains data needed to ascertain the presence and relative positions of each user file in a managed file. Without this information, restoration of the user file 1124 is impossible because the location of the user file 1124 within the managed file 1120 is uncertain.

Therefore, reconstruction can introduce various inconsistencies between a primary managed file and its counterpart backup copy. This situation can also arise where a backup copy is reconstructed, leaving its primary copy without current mapping information.

One solution is to perform a new storage pool backup operation whenever the new managed file 1140 is created. This operation would create a new backup copy (not shown), identical to the file 1140. Although this solution may be satisfactory for some users, other users may object to the additional time required to perform an otherwise unnecessary storage pool backup operation. Furthermore, this procedure may introduce a brief window of vulnerability during which the subsystem does not have a duplicate copy of the reconstructed aggregate. Consequently, the subsystem's ability to ensure continuous availability and recoverability of managed files is arguably diminished.

Thus, to avoid any problems caused by such inconsistencies between primary and backup managed file copies, the present invention employs "siblings". "Siblings" are different managed files containing the same constituent user files, irrespective of the presence or absence of deleted-file space in one sibling or the other. As explained below, the invention enjoys improved efficiency by recognizing that the backup copy 1120, although arranged differently than the reconstructed primary file 1140, contains the same underlying user files in the same order.

Reconstruction Creating Managed File Siblings

Figure 12:
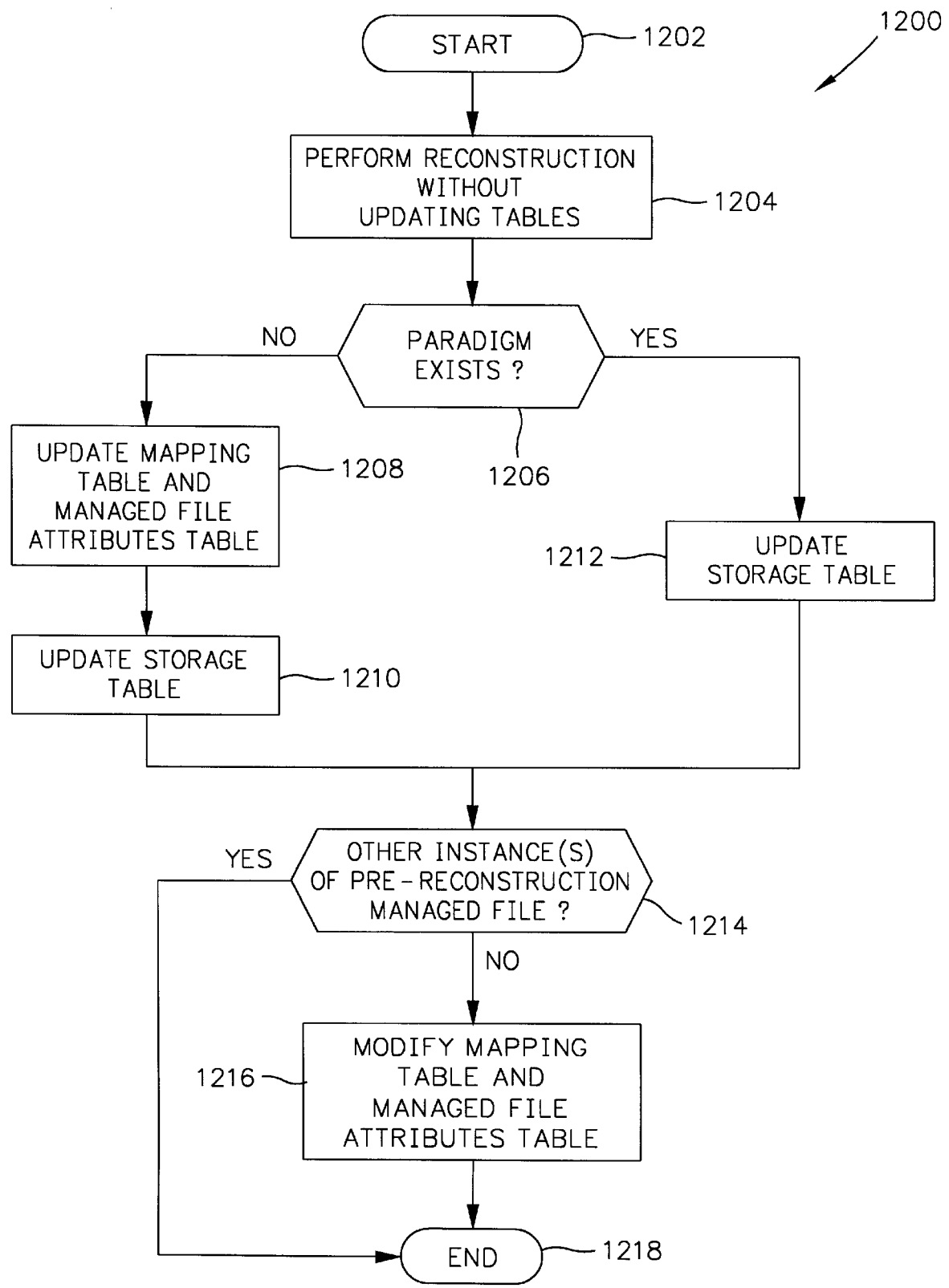
FIG. 12 is a flowchart of an alternate embodiment of reconstruction using managed file siblings, in accordance with the invention.

FIG. 12 shows a sequence of method steps 1200 to illustrate one example of reconstruction employing managed file siblings according to the invention. Broadly, managed files are "siblings" of each other if they contain exactly the same constituent user files in exactly the same order, regardless of the presence or absence of any interstitial vacancies in one file or the other. Thus, referencing FIG. 11, the reconstructed managed file 1140 and the un-reconstructed managed file 1120 are siblings of each other. Likewise, the unreconstructed files 1100 and 1120 are also siblings of each other. Referring now to FIG. 12, this example is described for ease of explanation, but without any limitation intended thereby, in the context of the previously described FIGS. 1–11. The steps 1200 are initiated in step 1202, which occurs under the same circumstances as the commencement of reconstruction in step 920 (FIG. 9), as discussed above.

After step 1202, step 1204 reconstructs a particular managed file as described above in FIG. 10; not included, however, are steps 1014, 1016, and 1017, which update the storage, mapping, and managed file attribute tables. After step 1204, step 1206 asks whether a "paradigm" managed file exists for the managed file being reclaimed. A paradigm managed file is one that contains the same constituent user files without any interstitial vacancies. Step 1206 may be determined by reviewing the mapping table (to identify other managed files containing the same user files) along with the managed file attributes table (to identify managed files with "total size" equal to "active size").

If a paradigm exists, step 1212 deletes reference in the storage table to the pre-reconstruction managed file. Step 1212 also updates the storage table by adding a new entry cross-referencing the paradigm's filename with an address in the storage hierarchy 114 containing the reconstructed managed file. Thus, by cross-referencing the existing paradigm file to the newly reconstructed file, step 1212 adds the newly reconstructed file as a same-filename sibling of the paradigm file, sharing the existing mapping table and managed file attributes table data of the paradigm file.

In contrast, if step 1206 does not find a paradigm, different table updates are performed to create a new-filename sibling of the pre-reconstruction managed file. In particular, step 1208 designates a new "sibling" filename for the reconstructed first managed file. Then, in the mapping table, step 1208 adds a new entry cross-referencing the sibling filename with each constituent user file and a corresponding location of each user file within the reconstructed first managed file. Step 1208 also adds an entry for the newly created sibling file in the managed file attributes table. Step 1210 adds a new entry to the storage table cross-referencing the sibling filename with an address in the subsystem containing the reconstructed managed file. Thus, steps 1208, 1210 add the reconstructed file as a new sibling to the pre-reconstructed file, creating new mapping, storage, and managed file attributes information for the sibling. Step 1210 also deletes storage table reference to the pre-reconstruction managed file, but avoids deleting mapping and managed file attributes table data for the pre-reconstruction file in case this data is being shared by other instances (i.e., same-filename siblings) of the pre-reconstruction file.

After steps 1210 or 1212, step 1214 determines whether other instances of the pre-reconstruction managed file exist in the storage hierarchy 114. This is performed by searching the storage table for the pre-reconstruction managed file's filename. If none is found, the mapping table is updated in step 1216 by deleting reference to the original filename. If other instances of the pre-reconstruction managed file exist, step 1214 skips step 1216 to preserve the shared mapping and managed file attributes data. After step 1216, or an affirmative answer to step 1214, the routine 1200 ends in step 1218.

Post-Reconstruction Use of Managed File Siblings

Figure 13:
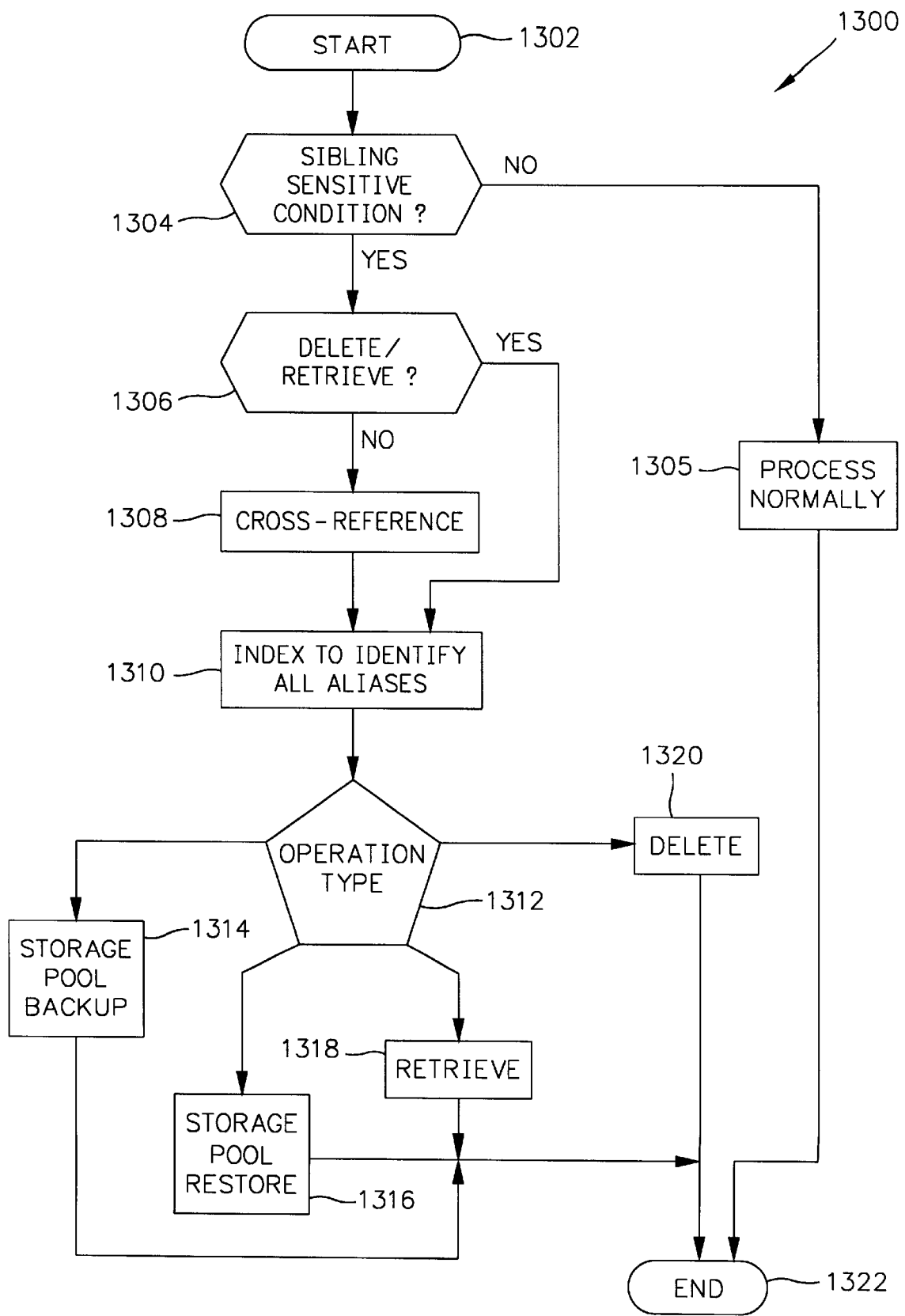
FIG. 13 is a flowchart of an operational sequence for data storage subsystem management with file aggregation, including measures implemented to utilize managed file siblings, in accordance with the invention.

FIG. 13 shows a sequence of method steps 1300 to illustrate an example showing the use of siblings by various client requests or internal data management operations. For ease of explanation, but without any limitation intended thereby, the example of FIG. 13 is described in the context of the previously described FIGS. 1–12.

The steps are initiated in step 1302, which occurs upon the initiation of a data access operation such as a client request or internal data management operation, seeking access to data stored in the hierarchy 114 (FIG. 1). Step 1304 then determines whether the performance of the initiated data access operation is affected by the use of siblings. In the illustrated example, such operations include storage pool backup, storage pool restore, client delete, and client retrieve. Storage pool backup is sibling-sensitive because an otherwise time-consuming backup of a post-reconstruction managed file may be avoided if a sibling of the pre-reconstruction managed file is already represented in the storage hierarchy 114. The storage pool restore operation is sibling-sensitive because each managed may be restored from any of its various siblings. The client delete operation is sibling-sensitive because a user file must be deleted from all siblings. The client retrieve operation is sibling-sensitive because a user file may be restored from any sibling managed file containing that user file. In addition to the foregoing, ordinarily skilled artisans (having the benefit of this disclosure) may recognize and implement other data access operations that would be sibling-sensitive. One example is off-site volume recycling, as discussed in U.S. Pat. No. 5,673,382 to Cannon et al., entitled "Automated Management of Off-Site Storage Volumes for Disaster Recovery", issued on Sep. 30, 1997 and assigned to IBM.

Data access operations other than sibling-sensitive operations are processed in step 1305 (as discussed above), after which the routine 1300 ends in step 1322. For the sibling-sensitive operations, however, the step 1304 progresses to step 1306. Step 1306 asks whether the operation is a client delete or client retrieve operation. If so, the routine 1300 jumps to step 1310, discussed below.

For other operations (i.e., storage pool backup and restore), step 1308 is performed. For each managed file in the requested storage pool backup or restore operation, step 1308 cross-references its managed filename in the mapping table to identify the filename of a specific user file. This user file may occupy any predetermined position in the managed file, such as the first position, last position, etc. Preferably, the user file employed in step 1308 occupies the first position in the managed file.

Next, step 1310 cross-references the identified user filename in the mapping table to identify all managed files also containing this user file. (If step 1310 is performed without step 1308, in the case of a client delete or client retrieve operations, step 1310 uses the filename of the requested user file sought to be deleted or retrieved.) As discussed in detail above, the subsystem 102 strictly ensures that each user filename only appears in managed files that are siblings; new instances of a user file are given a different user filename. Thus, step 1310 has the effect of generating a list of all siblings.

After step 1310, step 1312 branches in response to the type of the originating data access operation. For a storage pool backup, step 1314 separately considers each managed file of the source storage pool. If step 1310 identified any siblings of that managed file already in the target "pool", no additional backup is needed. Otherwise, if any sibling of the managed file is not present in the target pool, the managed file is copied to the target pool and entered into the storage table. Thus, the illustrated storage pool backup operation is an incremental backup operation, which only backs up those managed files that do not already have a sibling in the target pool.

For a storage pool restore, step 1316 reviews step 1310's list of siblings. For each managed file in the primary storage pool, if any siblings exist, certain predetermined criteria are applied to select the best sibling, and this sibling used as a source for the restore operation. In one implementation, the siblings used for restoration may reside in a backup storage pool; another embodiment, however, may also consider siblings contained in a primary storage pool. These predetermined criteria may consider a number of factors, such as the speed of the device containing the sibling, whether that device is presently busy, selection by a user or administrator, proximity or availability of the sibling's device, etc. If step 1310 did not identify any siblings, restoration is not possible for that managed file. These steps are repeated for each managed file of the storage pool under restoration.

For a client delete, step 1320 purges all mapping table entries for the user file identified by the client delete operation. Entries are purged regardless of which managed file they reside in, therefore treating all siblings alike.

For a client retrieve, certain predetermined criteria are applied to the siblings identified by step 1310 to select the best sibling, and this sibling used as a source for the retrieve operation. These predetermined criteria may consider a number of factors, such as the speed of the device containing the sibling, whether that device is presently busy, selection by a user or administrator, proximity or availability of the sibling's device, whether the sibling is a primary or backup copy, etc.

After step 1314, 1316, 1318, or 1320 completes, the routine 1300 ends in step 1322.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method of reconstructing a managed file originally created with a contiguous aggregation of constituent user files, said deleted-file space arising from deletion of individual user files from the managed file, said managed file residing at a source storage area, the managed file and all constituent user files being represented in (1) a mapping table cross-referencing each managed file with its constituent user files and a corresponding location of each user file within the managed file, and (2) a storage table cross-referencing each managed file with an address in the subsystem containing that managed file, the method comprising:

receiving a request to reconstruct a first managed file having an original filename;

reconstructing the first managed file by identifying contiguous regions of user files within the first managed file and copying each identified contiguous region to adjacent locations in a target storage area;

searching the mapping table for a paradigm managed file having contents identical to the reconstructed first managed file;

if the paradigm managed file is found, the paradigm managed file having a paradigm filename,
deleting reference in the storage table to the original filename; and
in the storage table, adding a new entry cross-referencing the paradigm filename with an address in the subsystem containing the reconstructed managed file;

if the paradigm managed file is not found,
designating a sibling filename for the reconstructed first managed file;
in the mapping table, adding a new entry cross-referencing the sibling filename with all constituent user files and corresponding locations of those user files within the reconstructed first managed file;
deleting reference in the storage table to the original filename; and
in the storage table, adding a new entry cross-referencing the sibling filename with an address in the subsystem containing the reconstructed managed file; and searching the storage table for the original filename, and if not found, updating the mapping table by deleting reference to the original filename and all data cross-referenced thereto.

2. The method of claim 1, the source and target storage areas having no storage space in common.

3. The method of claim 1, the source and target storage areas substantially overlapping.

4. The method of claim 1, where:
the method further comprises maintaining a managed file attributes table including a representation of each managed file along with the managed file's occupied space and active space, said active space being the occupied space reduced by any deleted-file space; and
the searching of the mapping table for a paradigm managed file having contents substantially identical to the reconstructed first managed file comprises:
searching the mapping table for a paradigm managed file with (1) same constituent user files as the reconstructed managed file, and (2) no deleted-file space.

5. A method of processing requests to access a storage subsystem that maintains managed files each originally created with a contiguous aggregation of constituent user files, each managed file and all constituent user files therein being represented in a mapping table cross-referencing each managed file with its constituent user files and a corresponding location of each user file within the managed file, the method comprising:

receiving a request to restore a first managed file to the storage subsystem;

utilizing the mapping table to identify a user file occupying a predetermined position in the first managed file;

utilizing the mapping table to identify all managed files containing the identified user file;

if one or more managed files other than the first managed file are identified, using predetermined criteria to select one of the identified managed files and restoring the first managed file from the selected managed file.

6. The method of claim 5, the predetermined position being a first-ordered position among user files in the first managed file.

7. The method of claim 5, the predetermined criteria selecting an identified managed file in response to manual designation by a user.

8. The method of claim 5, the predetermined criteria selecting a non-busy identified managed file.

9. The method of claim 5, the predetermined criteria selecting an identified managed file according to read access speeds of storage devices accessing the managed files in the subsystem.

10. A method of processing requests to access a storage subsystem that maintains managed files each originally created with a contiguous aggregation of constituent user files, each managed file and all constituent user files therein being represented in a mapping table cross-referencing each managed file with its constituent user files and a corresponding location of each user file within the managed file, the method comprising:

receiving a request to delete a first user file from the storage subsystem;

utilizing the mapping table to identify all managed files containing the first user file; and if one or more managed files are identified, updating the mapping table by deleting each entry referencing the first user file.

11. A method of processing requests to access a storage subsystem that maintains managed files each originally created with a contiguous aggregation of constituent user files, each managed file and all constituent user files therein being represented in a mapping table cross-referencing each managed file with its constituent user files and a corresponding location of each user file within the managed file, the method comprising:

receiving a request to retrieve a first user file from the storage subsystem;

utilizing the mapping table to identify all managed files containing the first user file; and if one or more managed files are identified, using predetermined criteria to select one of the identified managed files and providing an output of the first user file from the selected managed file.

12. The method of claim 11, the predetermined criteria selecting an identified managed file in response to manual designation by a user.

13. The method of claim 11, the predetermined criteria selecting a non-busy identified managed file.

14. The method of claim 11, the predetermined criteria selecting an identified managed file according to read access speeds of storage devices accessing the managed files in the subsystem.

15. A signal-bearing medium tangibly embodying a program of machine-readable instructions executable by a digital processing apparatus to perform a method for reconstructing a managed file originally created with a contiguous aggregation of constituent user files, said deleted-file space arising from deletion of individual user files from the managed file, said managed file residing at a source storage area, the managed file and all constituent user files being represented in (1) a mapping table cross-referencing each managed file with its constituent user files and a corresponding location of each user file within the managed file, and (2) a storage table cross-referencing each managed file with an address in the subsystem containing that managed file, the method comprising:

receiving a request to reconstruct a first managed file having an original filename;

reconstructing the first managed file by identifying contiguous regions of user files within the first managed file and copying each identified contiguous region to adjacent locations in a target storage area;

searching the mapping table for a paradigm managed file having contents identical to the reconstructed first managed file;

if the paradigm managed file is found, the paradigm managed file having a paradigm filename, deleting reference in the storage table to the original filename; and in the storage table, adding a new entry cross-referencing the paradigm filename with an address in the subsystem containing the reconstructed managed file;

if the paradigm managed file is not found, designating a sibling filename for the reconstructed first managed file;

in the mapping table, adding a new entry cross-referencing the sibling filename with all constituent user files and corresponding locations of those user files within the reconstructed first managed file;

deleting reference in the storage table to the original filename; and in the storage table, adding a new entry cross-referencing the sibling filename with an address in the subsystem containing the reconstructed managed file; and searching the storage table for the original filename, and if not found, updating the mapping table by deleting reference to the original filename and all data cross-referenced thereto.

16. The medium of claim 15, the source and target storage areas having no storage space in common.

17. The medium of claim 15, the source and target storage areas substantially overlapping.

18. The medium of claim 15, where:

the method further comprises maintaining a managed file attributes table including a representation of each managed file along with the managed file's occupied space and active space, said active space being the occupied space reduced by any deleted-file space; and the searching of the mapping table for a paradigm managed file having contents substantially identical to the reconstructed first managed file comprises:

searching the mapping table for a paradigm managed file with (1) same constituent user files as the reconstructed managed file, and (2) no deleted-file space.

19. A signal-bearing medium of processing requests to access a storage subsystem that maintains managed files each originally created with a contiguous aggregation of constituent user files, each managed file and all constituent user files therein being represented in a mapping table cross-referencing each managed file with its constituent user files and a corresponding location of each user file within the managed file, the method comprising:

receiving a request to restore a first managed file to the storage subsystem;

utilizing the mapping table to identify a user file occupying a predetermined position in the first managed file;

utilizing the mapping table to identify all managed files containing the identified user file;

if one or more managed files other than the first managed file are identified, using predetermined criteria to select one of the identified managed files and restoring the first managed file from the selected managed file.

20. The medium of claim 19, the predetermined position being a first-ordered position among user files in the first managed file.

21. The medium of claim 19, the predetermined criteria selecting an identified managed file in response to manual designation by a user.

22. The medium of claim 19, the predetermined criteria selecting a non-busy identified managed file.

23. The medium of claim 19, the predetermined criteria selecting an identified managed file according to read access speeds of storage devices accessing the managed files in the subsystem.

24. A signal-bearing medium of processing requests to access a storage subsystem that maintains managed files each originally created with a contiguous aggregation of constituent user files, each managed file and all constituent user files therein being represented in a mapping table cross-referencing each managed file with its constituent user files and a corresponding location of each user file within the managed file, the method comprising:

receiving a request to delete a first user file from the storage subsystem;

utilizing the mapping table to identify all managed files containing the first user file; and if one or more managed files are identified, updating the mapping table by deleting each entry referencing the first user file.

25. A signal-bearing medium of processing requests to access a storage subsystem that maintains managed files each originally created with a contiguous aggregation of constituent user files, each managed file and all constituent user files therein being represented in a mapping table cross-referencing each managed file with its constituent user files and a corresponding location of each user file within the managed file, and the method comprising:

receiving a request to retrieve a first user file from the storage subsystem;

utilizing the mapping table to identify all managed files containing the first user file; and if one or more managed files are identified, using predetermined criteria to select one of the identified managed files and providing an output of the first user file from the selected managed file.

26. The medium of claim 25, the predetermined criteria selecting an identified managed file in response to manual designation by a user.

27. The medium of claim 25, the predetermined criteria selecting a non-busy identified managed file.

28. The medium of claim 25, the predetermined criteria selecting an identified managed file according to read access speeds of storage devices accessing the managed files in the subsystem.

29. A data storage subsystem, comprising:
- a storage including a source storage area and a target storage area, said source storage area containing one or more managed files each including one or an aggregation of multiple constituent user files;
- a database, including (1) a mapping table cross-referencing each managed file with each constituent user file and a corresponding location of that user file within the managed file, and (2) a storage table cross-referencing each managed file with an address in the subsystem containing that managed file; and
- a digital data processing apparatus coupled to the storage and the database;
- wherein the digital data processing apparatus is programmed to perform a method for reconstructing a managed file originally created with a contiguous aggregation of constituent user files, said managed file containing deleted-file space arising from deletion of individual user files from the managed file, said managed file residing in the source storage area, the method comprising:
  - receiving a request to reconstruct a first managed file having an original filename;
  - reconstructing the first managed file by identifying contiguous regions of user files within the first managed file and copying each identified contiguous region to adjacent locations in a target storage area;
  - searching the mapping table for a paradigm managed file having contents identical to the reconstructed first managed file;
  - if the paradigm managed file is found, the paradigm managed file having a paradigm filename,
    - deleting reference in the storage table to the original filename; and
    - in the storage table, adding a new entry cross-referencing the paradigm filename with an address in the subsystem containing the reconstructed managed file;
  - if the paradigm managed file is not found,
    - designating a sibling filename for the reconstructed first managed file;
    - in the mapping table, adding a new entry cross-referencing the sibling filename with all constituent user files and corresponding locations of those user files within the reconstructed first managed file;
    - deleting reference in the storage table to the original filename; and
    - in the storage table, adding a new entry cross-referencing the sibling filename with an address in the subsystem containing the reconstructed managed file; and
    - searching the storage table for the original filename, and if not found, updating the mapping table by deleting reference to the original filename and all data cross-referenced thereto.

30. The subsystem of claim 29, the source and target storage areas having no storage space in common.

31. The subsystem of claim 29, the source and target storage areas substantially overlapping.

32. The subsystem of claim 29, where:
- the method further comprises maintaining a managed file attributes table including a representation of each managed file along with the managed file's occupied space and active space, said active space being the occupied space reduced by any deleted-file space; and
- the searching of the mapping table for a paradigm managed file having contents substantially identical to the reconstructed first managed file comprises:
  - searching the mapping table for a paradigm managed file with (1) same constituent user files as the reconstructed managed file, and (2) no deleted-file space.

33. A data storage subsystem, comprising:
- a storage including a source storage area and a target storage area, said storage containing one or more managed files each originally created with a contiguous aggregation of constituent user files;
- a database, including a mapping table cross-referencing each managed file with its constituent user files and a corresponding location of each user file within the managed file;
- a digital data processing apparatus coupled to the storage and the database;
- wherein the digital data processing apparatus is programmed to perform a method for processing requests to access data in the storage, the method comprising:
  - receiving a request to restore a first managed file to the storage subsystem;
  - utilizing the mapping table to identify a user file occupying a predetermined position in the first managed file;
  - utilizing the mapping table to identify all managed files containing the identified user file;
  - if one or more managed files other than the first managed file are identified, using predetermined criteria to select one of the identified managed files and restoring the first managed file from the selected managed file.

34. The subsystem of claim 33, the predetermined position being a first-ordered position among user files in the first managed file.

35. The subsystem of claim 33, the predetermined criteria selecting an identified managed file in response to manual designation by a user.

36. The subsystem of claim 33, the predetermined criteria selecting a non-busy identified managed file.

37. The subsystem of claim 33, the predetermined criteria selecting an identified managed file according to read access speeds of storage devices accessing the managed files in the subsystem.

38. A data storage subsystem, comprising:
- a storage including a source storage area and a target storage area, said storage containing one or more managed files each originally created with a contiguous aggregation of constituent user files;
- a database, including a mapping table cross-referencing each managed file with its constituent user files and a corresponding location of each user file within the managed file;
- a digital data processing apparatus coupled to the storage and the database;
- wherein the digital data processing apparatus is programmed to perform a method for processing requests to access data in the storage, the method comprising:
  - receiving a request to delete a first user file from the storage subsystem;
  - utilizing the mapping table to identify all managed files containing the first user file; and
  - if one or more managed files are identified, updating the mapping table by deleting each entry referencing the first user file.

39. A data storage subsystem, comprising:

a storage including a source storage area and a target storage area, said storage containing one or more managed files each originally created with a contiguous aggregation of constituent user files;

a database, including a mapping table cross-referencing each managed file with its constituent user files and a corresponding location of each user file within the managed file;

a digital data processing apparatus coupled to the storage and the database;

wherein the digital data processing apparatus is programmed to perform a method for processing requests to access data in the storage, the method comprising:
receiving a request to retrieve a first user file from the storage subsystem;
utilizing the mapping table to identify all managed files containing the first user file; and
if one or more managed files are identified, using predetermined criteria to select one of the identified managed files and providing an output of the first user file from the selected managed file.

40. The subsystem of claim 39, the predetermined criteria selecting an identified managed file in response to manual designation by a user.

41. The subsystem of claim 39, the predetermined criteria selecting a non-busy identified managed file.

42. The subsystem of claim 39, the predetermined criteria selecting an identified managed file according to read access speeds of storage devices accessing the managed files in the subsystem.

* * * * *